(12) United States Patent
Chaix

(10) Patent No.: US 9,644,615 B2
(45) Date of Patent: May 9, 2017

(54) DEVICE FOR CONVERTING HEAT ENERGY INTO MECHANICAL ENERGY

(75) Inventor: Jean-Edmond Chaix, Pierrevert (FR)

(73) Assignee: C3 CHAIX & ASSOCIES, CONSULTANTS EN TECHNOLOGIE, Pierrevert (FR)

( * ) Notice: Subject to any disclaimer, the term of this patent is extended or adjusted under 35 U.S.C. 154(b) by 423 days.

(21) Appl. No.: 13/997,830

(22) PCT Filed: Dec. 30, 2011

(86) PCT No.: PCT/FR2011/000686
§ 371 (c)(1),
(2), (4) Date: Jun. 25, 2013

(87) PCT Pub. No.: WO2012/089940
PCT Pub. Date: Jul. 5, 2012

(65) Prior Publication Data
US 2013/0276447 A1    Oct. 24, 2013

(30) Foreign Application Priority Data

Dec. 30, 2010   (FR) ....................................... 10 05172
Dec. 30, 2010   (FR) ....................................... 10 05173
Apr. 7, 2011    (FR) ....................................... 11 01045

(51) Int. Cl.
*F01K 21/00*    (2006.01)
*F01K 25/04*    (2006.01)
(Continued)

(52) U.S. Cl.
CPC .............. *F03G 6/003* (2013.01); *F01D 1/026* (2013.01); *F01D 1/32* (2013.01); *F01K 1/00* (2013.01);
(Continued)

(58) Field of Classification Search
CPC ........ F01K 21/005; F01K 25/04; F01K 25/06; F01K 13/00; F01K 21/04; F24J 2/07; Y02E 10/46; F01D 1/32; F01D 1/026
See application file for complete search history.

(56) References Cited

U.S. PATENT DOCUMENTS 2,151,949 A  *  3/1939 Turner .................... F01K 25/04
                                                    55/400
2,258,167 A     10/1941 Turner
(Continued)

FOREIGN PATENT DOCUMENTS

CH    672 368 A5   11/1989
DE    691 549 C    5/1940
(Continued)

OTHER PUBLICATIONS

English Language Machine Translation for DE 691549.*

*Primary Examiner* — Nicholas J Weiss
*Assistant Examiner* — Wesley Harris
(74) *Attorney, Agent, or Firm* — Oliff PLC

(57) ABSTRACT

A converter of kinetic energy from a jet formed by a heat transfer fluid and a gas at high temperature, includes: at least one injector of the jet from at least one source of heat transfer fluid and of high-temperature gas, an impulse wheel mounted rotating secured to a shaft extending along an axis substantially perpendicularly to the injector and including a plurality of asymmetric blades, a tank surrounding said impulse wheel and at least one deflector extending underneath the blades.

20 Claims, 16 Drawing Sheets

(51) Int. Cl.
| | |
|---|---|
| *F01K 25/06* | (2006.01) |
| *F24J 2/07* | (2006.01) |
| *F01D 1/32* | (2006.01) |
| *F01D 1/00* | (2006.01) |
| *F01K 13/00* | (2006.01) |
| *F01K 21/04* | (2006.01) |
| *F03G 6/00* | (2006.01) |
| *F01D 1/02* | (2006.01) |
| *F01K 3/18* | (2006.01) |
| *F22B 1/00* | (2006.01) |
| *F01K 1/00* | (2006.01) |
| *F01K 3/00* | (2006.01) |
| *F01K 7/00* | (2006.01) |
| *F28D 20/00* | (2006.01) |

(52) U.S. Cl.
CPC ............... *F01K 3/00* (2013.01); *F01K 3/186* (2013.01); *F01K 7/00* (2013.01); *F01K 13/00* (2013.01); *F01K 21/005* (2013.01); *F01K 21/04* (2013.01); *F01K 25/04* (2013.01); *F01K 25/06* (2013.01); *F22B 1/006* (2013.01); *F24J 2/07* (2013.01); *F28D 20/00* (2013.01); *Y02E 10/46* (2013.01); *Y02E 60/142* (2013.01)

(56) References Cited

U.S. PATENT DOCUMENTS

| | | | | |
|---|---|---|---|---|
| 3,516,248 | A | * | 6/1970 | McEwen ................. F01K 25/08 252/67 |
| 3,972,195 | A | * | 8/1976 | Hays ........................ F01D 1/06 416/197 R |
| 3,995,428 | A | | 12/1976 | Roberts |
| 4,008,573 | A | | 2/1977 | Petrillo |
| 4,106,294 | A | * | 8/1978 | Czaja ...................... F01K 21/04 60/649 |
| 4,363,641 | A | * | 12/1982 | Finn, III ............ B01D 19/0057 251/9 |
| 4,966,708 | A | * | 10/1990 | Oklejas ................ B01D 61/022 210/321.65 |
| 2005/0126170 | A1 | | 6/2005 | Litwin |
| 2007/0257131 | A1 | * | 11/2007 | Brett ..................... B05B 3/1035 239/223 |
| 2010/0176602 | A1 | | 7/2010 | Shinnar |

FOREIGN PATENT DOCUMENTS

| | | |
|---|---|---|
| DE | 27 57 306 A1 | 7/1979 |
| EP | 2 187 051 A1 | 5/2010 |
| FR | 2 405 443 A1 | 5/1979 |
| FR | 2 415 197 A1 | 8/1979 |
| GB | 2 410 770 A | 8/2005 |

\* cited by examiner

DEVICE FOR CONVERTING HEAT ENERGY INTO MECHANICAL ENERGY

BACKGROUND OF THE INVENTION

The invention relates to a device for converting heat energy into mechanical energy.

STATE OF THE ART

In a first case, installations called "on isolated site" enable thermal energy to be supplied from solar energy and this thermal energy can be converted into electric power and/or mechanical energy.

Collection and concentration of solar energy are well known: they can be constituted by parabolas, parabolic linear buckets, flat concentrators (heliostat) which concentrate solar rays at the top of a tower, or linear Fresnel lenses.

Installations called "on isolated site" comprise for example a wheel or a turbine driven in rotation by a mixture of two fluids, heat transfer fluid and thermodynamic fluid. Mixture of the two fluids is made for example in a nozzle inside which the thermodynamic fluid is vaporized due to the effect of the heated heat transfer fluid. The thermodynamic fluid expands, which creates a high-speed two-phase jet.

This jet is injected onto blades arranged around a shaft which it drives in rotation so as to produce mechanical energy, the shaft being connected to the turbine. The turbine thus operates as a converter of the kinetic energy of the jet into a rotational kinetic energy. In certain applications, the turbine is for example a Pelton turbine.

In the turbine, the thermodynamic fluid and the heat transfer fluid are partially separated so as to be recovered and re-used to form the two-phase jet. For such an installation to operate in correct and optimal manner, the heat transfer fluid and the thermodynamic fluid have to be separated in optimal manner, for example by more than 98%.

The use of a conventional Pelton turbine invented in 1880 by Lester Pelton, composed of an impulse wheel of the type used to recover energy from large-head waterfalls, is not satisfactory to obtain such a separation of the fluids of the two-phase jet. The turbine is bathed in a mist of heat transfer fluid and thermodynamic fluid which is stirred by the impulse wheel. The thermodynamic fluid vapor is very difficult to extract and often necessitates the addition of an additional centrifugal separator on outlet of the wheel, which makes the system more complex.

Furthermore, the Pelton turbine is mounted in the tank on ball-bearings which bathe in the high-temperature mixture of heat transfer fluid and thermodynamic fluid. The bearings are not suitable for operation at high temperature and for an impulse wheel rotating at high speed. The lifetime of this type of equipment is very low.

To palliate this drawback, the ball-bearings can be mounted in casings located outside the body of the converter containing the turbine, the shaft of the wheel then passing via a rotating seal to ensure the tightness between the inside of the converter and the outside. However, such seals do not guarantee a perfect tightness and are liable to present leaks, which is dangerous as the heat transfer fluid can inflame spontaneously in contact with the air.

In a second case, for machines that transform thermal energy into mechanical energy for example, expansion of a thermodynamic fluid is used that has gone from liquid state to vapor state, Rankine cycle, or already in gas form under pressure but greatly heated by means of a hot heat source: Joule cycle.

This transformation takes place by combustion (Beau de Rochas cycle in piston engines and gas turbines) or by boiling in a steam generator (Rankine cycle of conventional steam machines, or of steam turbines).

In these cycles, expansion of the thermodynamic fluid which is a real fluid is a polytropic expansion: the transformation takes place with heat exchange and friction and its state law is at all times $PV^\gamma$=constant between pressure P1 and pressure P2.

The fluid describes a cycle between the hot source and cold source which can be represented in the T (temperature), S (entropy) space by the diagram of FIG. 5 in which the surface of the polygon A A1 B D E A is the image of the power generated by the cycle, the segment D E representing the polytropic expansion. This surface can be compared with that of the Carnot cycle represented by the polygon A A1 C D D1 E1 A, in which the expansion represented by the segment DD1 is an isotherm.

It can obviously be observed that the Carnot cycle, all other things being equal, enables more mechanical energy to be recovered, this being due to the fact that expansion of the gas takes place in isothermal manner along the segment D D1.

If it is required to increase the efficiency of a cycle using steam as thermodynamic fluid, it therefore has to be expanded in isothermal manner. In conventional turbines, expansion of the steam takes place in specific blades the geometry of which does not enable heat to be transferred to it during this change.

Certain converters of thermal energy into mechanical energy described in the literature use expansion of a mixture of a thermodynamic fluid (water vapor) and of a heat transfer fluid (glycerol) which should ensure a certain isothermality by transferring calories from liquid phase to gas phase. The mixture outlet from a generating nozzle at high speed is sent to an impulse wheel which can drive a mechanical system or an alternator for example.

Generation of water vapor by mixing liquid water with glycerine, used to make a volumetric turbine rotate, is described in the Patent DE 691 549 C of 30 May 1940. The two-phase mixture obtained, composed of oil at high temperature and water, does however present the following drawback: the oil can incorporate water, which leads to a considerable loss of energy and non-isothermal expansion. The device described is not functional and does not solve the problem that is posed.

This principle is also used for a mixture of steam under pressure and liquid, such as oil for example in the U.S. Pat. No. 2,151,949, or for a mixture of exhaust gas and water in the U.S. Pat. No. 3,972,195 of 3 Aug. 1976 in order to drive a Pelton turbine. In the latter case, the evolution of the gases is not isothermal as the water increases the cooling generated by their expansion.

In these systems, heat transfer between phases is limited due to the fact that the mixture length is also limited to minimize losses of head. The exchanges between gas and liquid are limited on account of the poor heat exchange coefficient in gas phase and of the briefness of their contact in the nozzle. Furthermore, when glycerol and water are mixed at about ten bars and at a temperature of 290° C., which are the inlet conditions of the expansion nozzle, the latter instantaneously absorbs 30 to 40% of the water. This water then vaporizes progressively during expansion and therefore leads to a reduction of the temperature of the mixture. The water from the vapor phase can be partially recondensed which results in large efficiency losses.

In this case, the steam cannot undergo expansion in isothermal manner and the cycle efficiency is therefore very far from the Carnot cycle.

In a third case, the heat transfer fluid can also be used in thermal energy storage installations. For example, certain concentrating solar power plants currently under construction have in series with the solar concentrator (hot source): a heat transfer fluid circuit, a conversion module of thermal energy into electric power and a large-capacity tank which stores heat in sensitive form.

When there is no sun, the conversion module is supplied by the heat stored in the tank. In this restoration phase, the temperature of the tank decreases continuously and this mode of use has to stop as soon as its temperature no longer enables the module for converting thermal energy into electric power to operate under good conditions. The conversion efficiency decreases with the temperature. The small temperature difference admissible between full and empty storage, about 30° C., added to the low specific heat of industrial transfer fluids, means that the volumes of these systems attain very high values.

OBJECT OF THE INVENTION

The object of the invention is to at least partially remedy the shortcomings of the prior art. The object of the invention is in particular to form a kinetic energy converter having an improved operation with a jet formed by a mixture of a heat transfer fluid and a gas at high temperature while at the same time ensuring a good separation of the heat transfer fluid and of the gas and guaranteeing dependable operation of the converter. This object is achieved by the appended claims and in particular by the fact that the conversion device comprises:
- a first fluid feed line,
- a heat transfer fluid feed line,
- a steam generator provided with:
  - a first inlet connected to the first fluid feed line, the first fluid taking a first path between the first inlet and a first outlet,
  - a second inlet receiving the heat transfer fluid, the heat transfer fluid taking a second path between the second inlet and a second outlet, the second path being distinct from the first path, the first path being thermally coupled to the second path so as to form steam from the first fluid, said steam being outlet from the generator via the first outlet,
- a chamber provided with:
  - a first inlet connected to the first outlet of the steam generator, the first fluid taking a first path in the chamber between the first inlet and a first outlet, the chamber being configured to perform isothermal expansion of the first fluid in the chamber by means of fractioned expansion by a plurality of elementary isothermal expansions,
  - a second inlet connected to the heat transfer fluid feed line, the heat transfer fluid taking a second path distinct from the first path between the second inlet and a second outlet, the second outlet of the chamber being connected to the second inlet of the steam generator, the first path being thermally coupled to the second path so as to heat the first fluid between each expansion,
- a mixing device connected to the first outlet of the chamber and to the second outlet of the steam generator and configured so as to mix the first fluid in vapour form with a heat transfer fluid to obtain a two-phase mixture.

Another object of the invention concerns a thermal energy storage installation comprising a heat transfer fluid tank, a solar concentrator coupled to the tank and configured to heat the heat transfer fluid, and an immersion heater arranged in the tank. A steam generator is fed by the heat transfer fluid. An alternator is fed by means of said steam, the alternator being configured to feed the immersion heater when the temperature of the tank equals the temperature of the heat transfer fluid on outlet of the concentrator, so as to increase the temperature of the tank to a higher temperature than that of the concentrator.

For this purpose, the invention relates to a converter of kinetic energy from a jet formed by a heat transfer fluid and a gas at high temperature, comprising:
- at least one injector of the jet from at least one source of heat transfer fluid and of high-temperature gas,
- an impulse wheel mounted rotating secured to a shaft extending along an axis substantially perpendicularly to the injector, said wheel comprising a plurality of asymmetric blades, the jet being injected onto said blades so as to drive the shaft in rotation and to transform the axial kinetic energy of the jet into rotational kinetic energy of the shaft,
- a tank surrounding said impulse wheel, said tank extending substantially along the axis of the impulse wheel.

The kinetic energy converter comprises at least one deflector extending underneath the blades, said deflector presenting a shape arranged to recover the mixture of heat transfer fluid and of high-temperature gas on outlet of the impulse wheel and to redirect said mixture in a substantially tangential direction to the wall of the tank, said wall of the tank being arranged so as to impart a cyclone effect on said mixture so as to separate the heat transfer fluid from the high-temperature gas, the tank comprising elements for recovering the heat transfer fluid and the high-temperature gas.

The deflector on outlet of the wheel enables the stratification of the mixture on outlet of the wheel to be maintained and prevents the formation of mist, which facilitates separation of the fluids of the mixture. The cyclone effect imparted on the mixture further enables this separation which then takes place in optimal manner.

According to the features of the kinetic energy converter:
- the deflector comprises at least one opening inlet of the mixture of heat transfer fluid and of high-temperature gas on outlet from the impulse wheel, said opening extending in a plane substantially perpendicular to the axis of the wheel, and an outlet opening of the mixture, said opening extending in the vicinity of the wall of the tank and in a plane substantially perpendicular to the plane of the inlet opening, said inlet opening and said outlet opening being connected to one another by an enclosure presenting a curved shape:
- the deflector comprises at least two inlet openings and at least two corresponding outlet openings, said openings being separated by at least one inner wall extending in the enclosure in substantially parallel manner to the latter so as to define at least two flow channels in said enclosure:
- the energy converter comprises a plurality of jet injectors formed by a heat transfer fluid and a gas at high temperature and an equal number of deflectors extending underneath the blades of the impulse wheel:

the blades each present an asymmetric concaveness with respect to an axis substantially perpendicular to the bottom of said concaveness, the blade comprising a top part and a bottom part extending on each side of the axis, the radius of curvature of the top part being different from the radius of curvature of the bottom part:

the injector is arranged to inject the jet onto the top part of the blades:

the tank comprises a substantially truncated cone-shape bottom, the elements for recovering the heat transfer fluid being arranged in said bottom, and a wall of substantially cylindrical shape extending from the bottom along the axis of the impulse wheel:

the shaft of the wheel is fitted on the bottom of the tank by means of at least one plain thrust bearing of hydrodynamic type so as to allow rotation of the shaft with respect to the tank.

the energy converter comprises a tightly-sealed, heat-insulated enclosure surrounding the tank and the shaft of the impulse wheel, the element for recovering the high-temperature gas being arranged in a top part of said enclosure, and the shaft of the impulse wheel egresses from the enclosure via a piston arranged to ensure the tightness between the inside of the enclosure and the outside of the enclosure.

The invention also relates to an installation for performing conversion of thermal energy into mechanical energy of the type comprising a heat transfer fluid source, a vaporizable fluid source, and systems for heating the heat transfer fluid, the heated heat transfer fluid being mixed with the vaporizable fluid so as to vaporize said fluid, said mixture being injected into a kinetic energy converter in the form of a jet, said converter being arranged to transform the axial kinetic energy of the jet into rotational kinetic energy of a shaft of said converter, in which the kinetic energy converter is as described above.

According to other features of the conversion installation:

the shaft of the energy converter is connected to an alternator which it drives in rotation, the alternator being arranged to produce electric power from the rotational kinetic energy of the shaft:

the system to heat the heat transfer fluid comprise solar energy collection means, the collected energy heating a flow pipe of the heat transfer fluid.

the conversion installation comprises flow pipes of the heat transfer fluid recovered by the energy converter for flow to storage device of said fluid and/or to the systems to heat the heat transfer fluid in order to enable re-use of said fluid and:

the conversion installation comprises flow pipes of the gas at high temperature recovered by the energy converter for flow to cooling elements enabling said gas to be condensed and flow elements of the condensed gas to storage elements forming the vaporizable fluid source in order to enable re-use of said gas.

BRIEF DESCRIPTION OF THE DRAWINGS

Other advantages and features will become more clearly apparent from the following description of particular embodiments of the invention given for non-restrictive example purposes only and represented by the appended drawings.

DESCRIPTION OF PARTICULAR EMBODIMENTS

Figure 1:
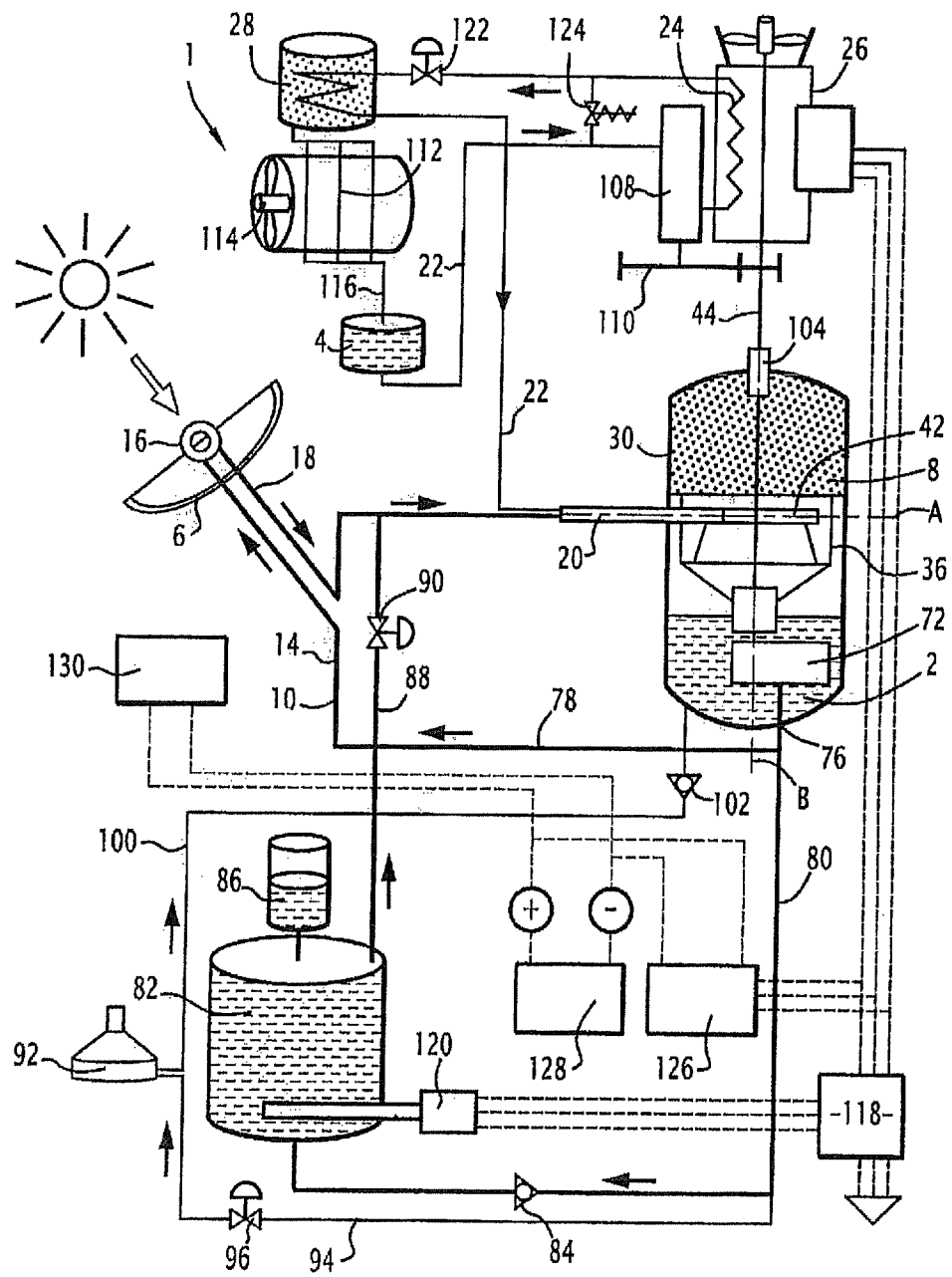
FIG. 1 is a schematic representation of an installation for converting thermal energy into mechanical energy according to the invention.

In a first case, with reference to FIG. 1, an installation 1 is described for converting thermal energy into mechanical energy, more advantageously into electric power. This installation is in particular designed to be used on an isolated site, such as for example in a desert or on an island.

Installation 1 comprises a heat transfer fluid source 2, a vaporizable fluid source 4, heating means 6 of the heat transfer fluid, and a kinetic energy converter 8. Installation 1 comprises a set of pipes 10 enabling the heat transfer fluid and the vaporizable fluid to be transported between these different elements.

Heat transfer fluid source 2 is for example a glycerol tank, the heat transfer fluid properties of which are known and are particularly suitable for conversion installation 1. Glycerol is in fact designed to be mixed with water, which forms for example the vaporizable fluid, at high temperature. This glycerol/water mixture is particularly advantageous as it is chemically stable, miscible, without an azeotrope or stable compounds at high temperature. The glycerol and water can thus be separated after the mixture has been used and do not present any risk of being used in a mixture.

As indicated above, the vaporizable fluid, or thermodynamic fluid, source is a water tank, water being suitable to be vaporized by the heat transfer fluid at high temperature. A thermodynamic fluid is a fluid serving the purpose of driving a turbine or a motor.

Installation 1 comprises a flow pipe 14 enabling heat transfer fluid to be conveyed from source 2 to heating means 6. These heating means 6 are for example formed by solar energy collection means 16, the collected energy enabling the heat transfer fluid to be heated for example by heating heat transfer fluid flow pipe 14. These collection means 16 are known and can be formed by parabolas, parabolic linear buckets, heliostats or linear Fresnel lenses.

These heating means 6 enable the heat transfer fluid to be heated to an operating temperature substantially comprised between 300° C. and 400° C. Alternatively, heating means 6 can be formed by a gas boiler or other suitable means. The operating temperature of the heat transfer fluid depends on its nature and on the requirements of the installation, in particular on the nature of the vaporizable fluid.

On outlet from heating means 6, a pipe 18 conveys the heat transfer fluid to an injector 20 formed by a nozzle.

The water coming from water tank 4 passes via pipe 22 which conveys it to injector 20 passing via preheating means. These preheating means comprise for example a cooling head 24 of an alternator 26 driven in rotation by converter 8, as will be described further on, and a desuperheater 28.

The water therefore presents an increased thermal energy before it is inlet to injector 20 where it mixes with the heated heat transfer fluid.

In the injector, the mixture between the water and the heat transfer fluid has the effect of vaporizing the water on account of the temperature of the heat transfer fluid. The gas at high temperature formed by the water vapor expands in injector 20 in substantially isothermal manner, which has the effect of increasing the kinetic energy of the mixture inlet to injector 20 so that a high-speed jet is obtained formed by a heat transfer fluid and a gas at high temperature in injector 20. It should be noted that isothermal expansion of water vapor is a transformation that presents the best conversion efficiency of thermal energy into kinetic energy. The jet obtained therefore presents a high kinetic energy.

Injector 20 penetrates into kinetic energy converter 8 along a substantially horizontal axis A.

Figure 2:
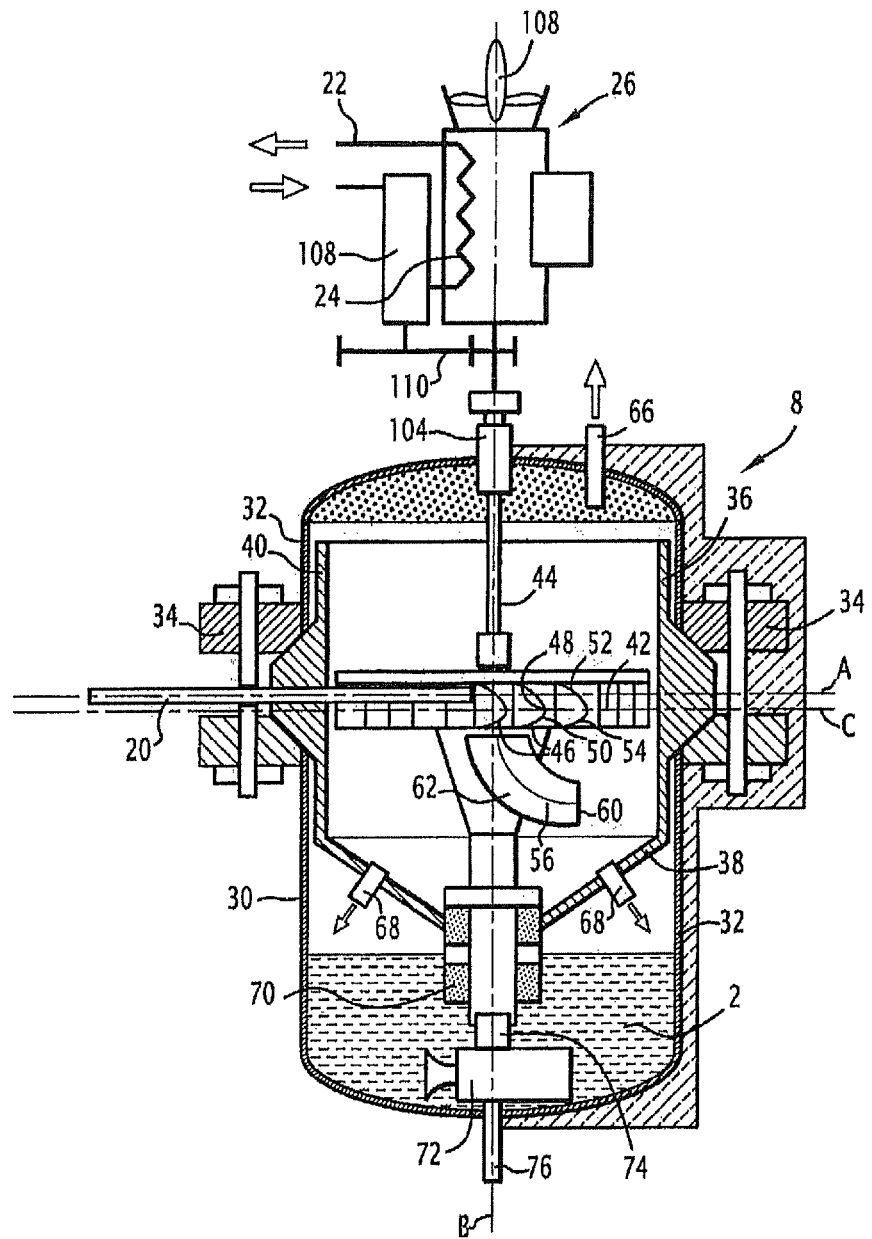
FIG. 2 is a schematic cross-sectional representation of a kinetic energy converter according to the invention used in the installation of FIG. 1.

Kinetic energy converter 8, more particularly represented in FIG. 2, comprises a heat-insulated enclosure 30 formed by two convex half-shells 32 of elliptic shape advantageously welded onto two flanges 34. Welding of the two half-shells 32 forms a tight enclosure 30 of substantially vertical axis B perpendicular to the axis A of injector 20. The bottom of enclosure 30 forms for example a heat transfer fluid tank 2 where the fluid is collected after it has passed through converter 8, as will be described further on.

A tank 36 is provided inside the enclosure 30. This tank 36 is formed by a substantially truncated cone-shaped bottom 38 or in the form of a funnel and a wall 40 of substantially cylindrical shape extending from bottom 38, bottom 38 and wall 40 extending along the axis B.

A cylindrical impulse wheel 42 is mounted rotating on tank 36 by means of a shaft 44 extending along the substantially vertical axis B. Impulse wheel 42 is located facing injector 20 so that the jet injected by the latter drives impulse wheel 42 and shaft 44 in rotation so as to transform the axial kinetic energy of the jet into rotational kinetic energy of shaft 44. Impulse wheel 42 is located in enclosure 30.

Impulse wheel 42 comprises a plurality of blades 46 extending substantially radially and presenting a concave shape. The concave part 48 of blades 46 is facing in the direction of injector 20 so that the injected jet coming from the injector reaches said concave parts 48 and results in rotation of wheel 42. The concave part of blades 46 presents an asymmetric shape with respect to an axis C passing via bottom 50 of concave parts and substantially perpendicular to these concave parts, i.e. substantially parallel to the axis on top of axis C and a bottom part extending above axis C and a bottom part 54 extending underneath axis C. The top part 52 and bottom part 54 present different radiuses of curvature and lengths. In particular, the radius of curvature of bottom part 54 is much greater than the radius of curvature of top part 52, whereas the length of bottom part 54 is larger than the length of top part 52.

Injector 20 is arranged to inject the jet onto top part 52 of blades 46. The position of injection of the jet onto blades 46 and the particular shape of the latter enable the path of the jet in blades 46 to be lengthened and the stratification of this jet on outlet from the blades to be improved, which enables subsequent separation of the heat transfer fluid and of the high-temperature gas. The outlet angle of the jet of blades 46, i.e. the angle formed between the tangent to the end of the bottom part of the blade and the horizontal axis C, is substantially comprised between 8° and 12°, so that the jet on outlet from blade 46 presents a much greater kinetic energy than in a conventional Pelton turbine where the outlet angle of the blades is substantially comprised between 4° and 8°. This kinetic energy increase improves separation of the heat transfer fluid and of the high-temperature gas.

Figure 3:
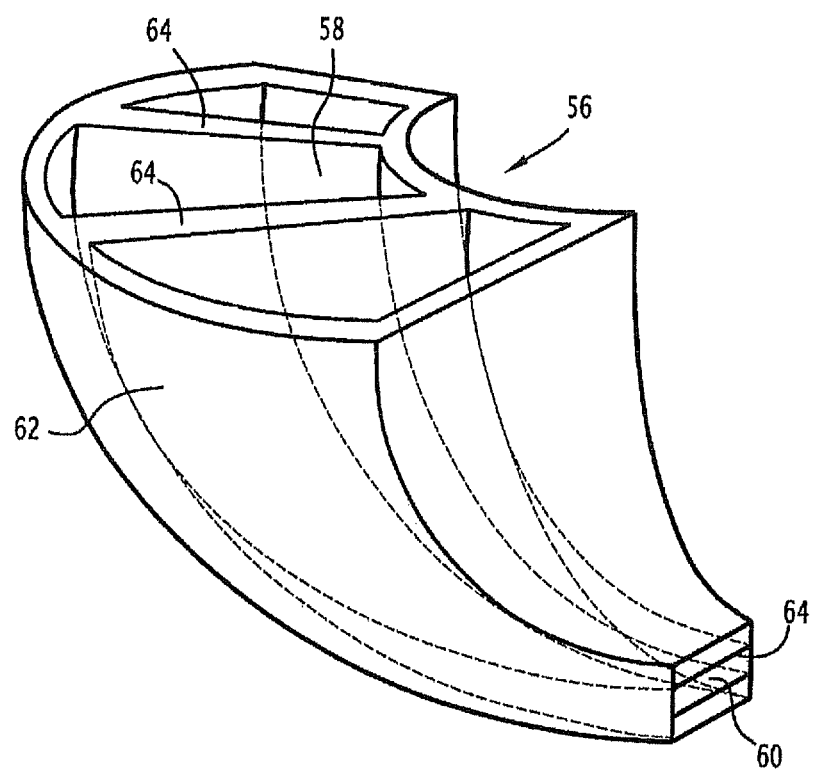
FIG. 3 is a schematic perspective representation of a deflector used in the kinetic energy converter of the FIG. 2.
Figure 4:
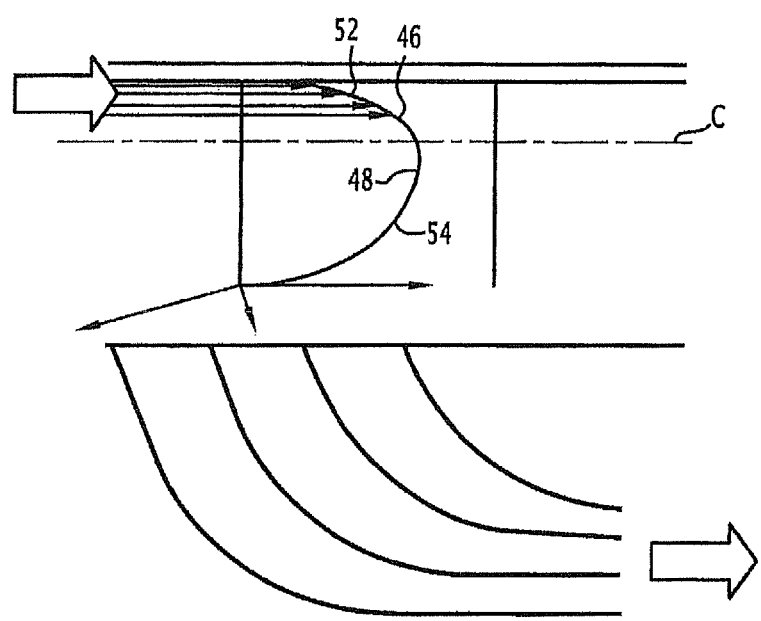
FIG. 4 is a schematic representation of the path of the jet formed by a heat transfer fluid and a gas at high temperature in the impulse wheel and in the deflector of the converter according to the invention.
Figure 5:
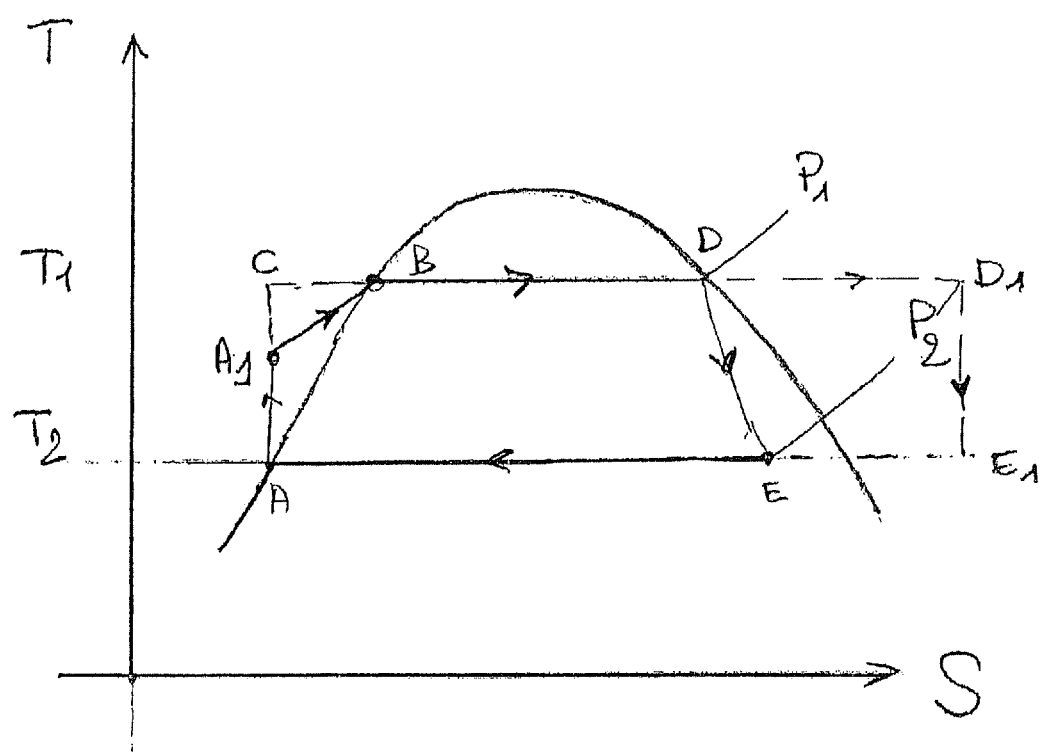
FIG. 5 gives an illustration of the Rankine and Carnot cycles in the T, S (Temperature, Entropy) diagram.

Indeed, on outlet from blade 46, the jet enters into a deflector 56 extending underneath blades 46 and arranged to reorient the received fluid to wall 40 of tank 36. The deflector enables the mixture of heat transfer fluid and high-temperature gas to be stratified, as represented in FIG. 4. In particular, deflector 56, more particularly represented in FIG. 3, presents a shape arranged to recover the mixture outlet from wheel 42 in a substantially vertical direction and to reorient this mixture continually in a substantially horizontal direction, as represented in FIG. 4, so that it is output from deflector 56 in tangential manner to wall 40 of tank 36, i.e. the mixture is output from deflector 56 running along wall 40 of tank 36. For this purpose, deflector 56 comprises at least one inlet opening 58 of the mixture of heat transfer fluid and high-temperature gas on outlet from impulse wheel 42, said opening extending in a substantially perpendicular plane to the rotation axis B of wheel 42, i.e. a substantially horizontal plane, and an outlet opening 60 of the mixture, said opening extending in the vicinity of wall 40 of tank 36 and in a substantially vertical plane, having a side face extending in the vicinity of the wall 40 of the tank 36 and in a plane substantially perpendicular to the top face, the side face defining at least one outlet opening 60 of the mixture. Inlet opening 58 and outlet opening 60 are connected to one another by an enclosure 62 presenting a curved shape, as represented in FIG. 3. According to the particular embodiment represented in FIG. 3, inner walls 64 extend inside enclosure 62 in substantially parallel manner to the latter so as to define flow channels of the mixture in the enclosure and to separate several inlet openings 58 and a corresponding number of outlet openings 60.

Separation of the heat transfer fluid and of the high-temperature gas begins in blades 46 by centrifugation of the mixture due to the shape of blades 46. When passing in deflector 56, the rest of the mixture is stratified and goes continually from a flow in the outlet direction of wheel 42 to a flow tangential to wall 40 of tank 36, as represented in FIG. 4. This tangential flow causes centrifugation of the mixture on account of the cylindrical shape of wall 40, which enables separation of the high-temperature gas and of the heat transfer fluid by cyclone effect to be completed. Separation of the mixture is thus performed in optimal manner so that the heat transfer fluid and the high-temperature gas are separated to an extent of more than 98%. Providing an impulse wheel 42 in rotation around a substantially vertical axis B enables the cyclone effect to be created on the wall of the tank, due to the fact that a deflector 56 can be placed reorienting the mixture in suitable manner.

Figure 16:
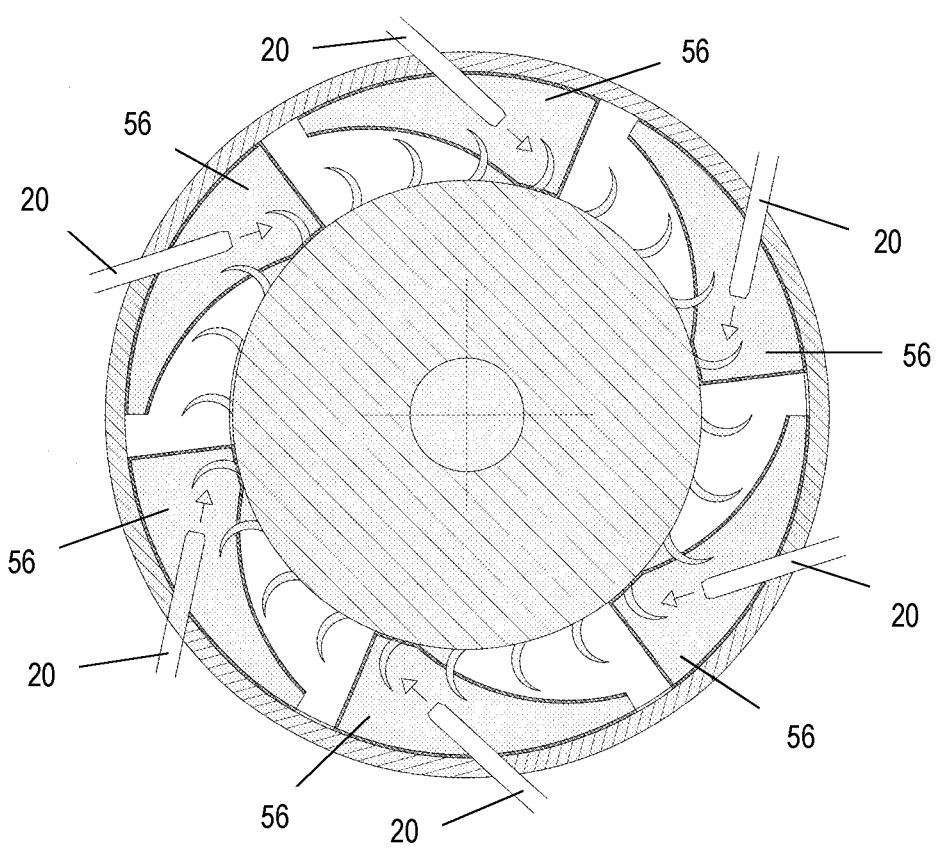
FIG. 16 gives the diagram of the energy converter that comprises six injectors and an equal number of deflectors according to an embodiment of the present application.

According to one embodiment, the energy converter comprises several injectors 20, for example six as in a conventional Pelton turbine, and an equal number of deflectors 56, as represented in FIG. 16.

Once separated, the heat transfer fluid is driven to the bottom of tank 36 by gravity, whereas the high-temperature gas formed by the water vapour is displaced to the top of enclosure 30. The top part of enclosure 30 comprises recovery means 66 of the high-temperature gas separated from the heat transfer fluid. The high-temperature gas is outlet from the enclosure via these recovery means 66 and flows in the rest of the installation as will be described further on.

Bottom 38 of tank 36 comprises recovery means 68 of the heat transfer fluid so that the latter passes into tank 2 when outlet from tank 40. These recovery means 68 are for example formed by outlet flow holes made in bottom 38 of tank 36 and communicating between tank 36 and the bottom of enclosure 30.

The recovered heat transfer fluid serves the purpose in particular of lubricating at least one plain thrust bearing 70 of hydrodynamic type via which shaft 44 of impulse wheel 42 is mounted rotating on bottom 38 of tank 36. Plain thrust bearing 70 in fact bathes in the heat transfer fluid recovered by recovery means 68. Such a bearing 70 enables rotation of shaft 44 to be performed at high speed in a high-temperature environment with a long lifetime, unlike conventional ball-bearings. Furthermore, installation of bearing 70 inside enclosure 30 circumvents any problems of tightness and enables leakage of the heat transfer fluid, which could be dangerous, to be prevented. According to the embodiment represented in FIG. 2, converter 8 comprises two plain thrust bearings 70.

In tank 2, a heat transfer fluid flow pump 72, for example of volumetric type, is fitted on shaft 44 by means of a homokinetic seal 74. This part is connected to an outlet pipe 76 connecting the inside of enclosure 30 to the outside and enabling the heat transfer fluid to be made to flow to the rest of installation 1. Flow pump 72 is thus arranged to suck heat transfer fluid 2 from the tank and to inject it into outlet pipe 76. The flow pump is devoid of a drive motor as actuation of the latter is performed by rotation of shaft 44 of impulse wheel 42 driven by the jet injected by injector 20.

Outlet pipe 76 is connected to a flow pipe 78 connected to heat transfer fluid flow pipe 14 passing via heating means 6. The heat transfer fluid output from enclosure 30 is thus re-used to form the jet injected by injector 20. Outlet pipe 76 is further advantageously connected to a flow pipe 80 connected to a storage tank 82 passing via a check valve 84.

Storage tank 82 is kept at constant pressure, for example about 10 bars (1 bar being equal to $10^5$ Pa), by flow pump 72. Tank 82 can be connected to a membrane accumulator 86 acting as an expansion vessel to compensate the dilatation or contraction of the heat transfer fluid in tank 82. This storage tank 82 constitutes a thermal energy source, the heat transfer fluid present in this tank 82 being kept at a high temperature. A flow pipe 88 connected to injector 20 extends between storage tank 82 and injector 20 so that the hot heat transfer fluid contained in tank 82 can be used to form the jet injected by the injector. Thus, when heating means 6 are no longer operating, for example during a cloudy spell making solar energy collector 16 inoperative or during the night, the installation continues to operate. A control valve 90 is fitted on the path of flow pipe 88 to perform control of the flowrates in heat transfer fluid flow pipes 14, 18, 78, 80, 88.

A part of the heat transfer fluid outlet via outlet pipe 76 can also serve the purpose of supplying thermal energy to cooking plates and/or to a bread oven 92, or any other installation requiring a thermal energy supply, by means of a flow pipe 94 passing via a control valve 96, the heat transfer fluid used being re-injected into tank 2 by means of a flow pipe 100 passing via a check valve 102. The heat transfer fluid used by installation 1 thereby makes it possible to have a thermal energy source in addition to serving the purpose of forming the jet supplying energy converter 8.

In a particular embodiment, shaft 44 of impulse wheel 42 egresses from enclosure 30 via a piston 104 arranged to ensure the tightness between the inside of enclosure 30 and the outside of enclosure 30, for example a Swedish piston. Shaft 44 drives the rotor of alternator 26, advantageously of permanent magnet type, in rotation. This alternator 26 enables the rotational kinetic energy of shaft 44 to be transformed into electric power. Alternator 26 is cooled, at the level of its air-gap, by a fan 106 fitted on its rotor and by a water flow pipe, forming cooling head 24, which sheathes its stator. The water feeding cooling head 24 comes from water tank 20 and is conveyed to the head by a volumetric pump 108 actuated by shaft 44 via a reducing gear 110. Pump 108 therefore does not comprise an actuating motor. Cooling head 24 serves the purpose of cooling alternator 26 and of preheating the water, as described in the foregoing.

The water vapour collected by recovery means 66 provided in enclosure 30 is advantageously returned to tank 4. In preferential manner, the water vapour collected by recovery means 66 provided in enclosure 30 is cooled by a desuperheater 28 passing via a pipe (not represented). This cooled water vapour is then condensed and sub-saturated in a battery of finned tubes 112 of a cooling tower 114 and is returned to water tank 4 by means of a flow pipe 116, before being re-used to form the jet injected by injector 20, as described in the foregoing.

Alternator 26 is used to supply electric power to a power distribution network 118, as well as immersion heaters 120 arranged to maintain the temperature of heat transfer fluid storage tank 82, as described in the foregoing.

Normal operation of installation 1 described above, and also operation during the night or during a cloudy spell, are clearly apparent on reading the foregoing description.

Operation on start-up of installation 1 will now be described whereas energy converter 8 is shut down and volumetric pumps 72 and 108 are not operating. To enable this start-up, a valve 122 enabling the water inlet to desuperheater 28 to be cut off and a discharge valve 124 connecting cooling head 24 to the inlet of volumetric pump 108 are provided. When start-up of the installation is performed, valve 122 is closed and the water flowing via volumetric pump 108 therefore does not supply injector 20 but returns to the inlet of the volumetric pump via discharge valve 124. Alternator 26 is started in synchronous mode by a field vector control timer 126, supplied by a storage battery 128 which is for example kept on charge during the daytime by photovoltaic panels 130. This start-up of alternator 26 has the effect of causing rotation of shaft 44 of impulse wheel 42, which results in start-up of volumetric pump 72 and of volumetric pump 108. The flow of heat transfer fluid and of water is thereby triggered. When the temperature of the heat transfer fluid at the inlet of injector 20 reaches a sufficient temperature to vaporize the water, valve 122 is opened and installation 1 switches to normal operation.

The installation described above can operate in perfect autonomy and is therefore particularly suitable for use on an isolated site. Energy converter 8 enables the heat transfer fluid to be efficiently separated from the high-temperature gas in order to achieve optimal operation of installation 1.

The nature of the fluids used, the heat transfer fluid and water, enables risks to be reduced in the event of a leakage occurring. These fluids are in fact not dangerous for peoples' health and can easily be handled. Furthermore, these products can be ingested without any risk by a living organism, which is favourable to protection of the environment in which installation 1 is implemented.

Operation of the volumetric pumps without a motor and reversible operation of the alternator improve the efficiency of the installation, as start-up of the installation does not require a starter motor. Furthermore, this absence of motor improves the dependability of installation 1 which does not depend on satisfactory operation of a motor.

Figure 6:
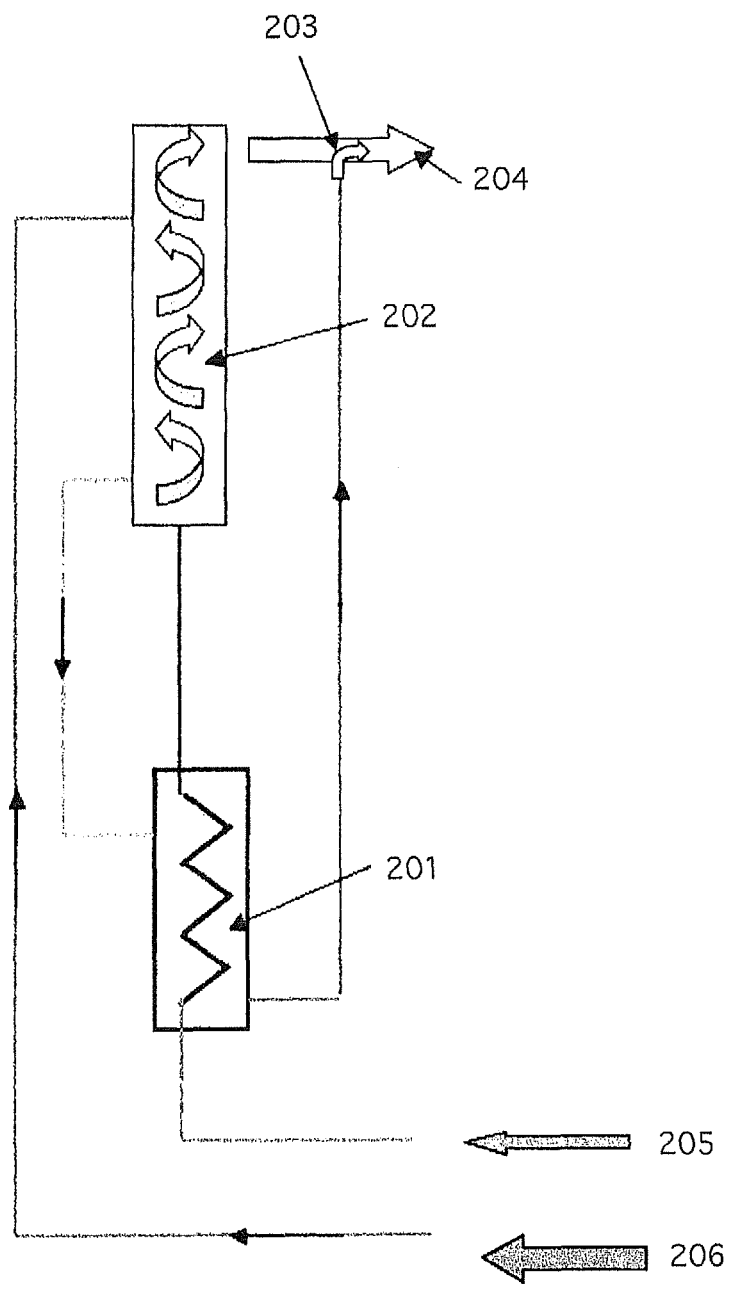
FIG. 6 gives the diagram of the circuits enabling, from a flux of hot glycerol at 340° C. according to the invention:
superheated steam to be generated at 10 bar and 290° C.,
expansion to be performed in isothermal manner to 1.5 bar and 290° C.,
the heat transfer fluid flux to be sprayed into the steam flux,
this mixture to be injected into the impulse turbine.

In a second case and according to another particular embodiment of the invention, as represented in FIG. 6, the device for converting thermal energy into mechanical energy comprises a feed line 205 of a first fluid and a heat transfer fluid feed line 206. It also comprises a steam generator 201 provided with a first inlet connected to first fluid feed line 205. The first fluid takes a first path between the first inlet and a first outlet. The steam generator is also provided with a second inlet receiving the heat transfer fluid. The heat transfer fluid takes a second path between the second inlet and a second outlet. The second path is distinct from the first path. The first path is thermally coupled to the second path so as to form steam from the first fluid. The steam is output from generator 201 via the first outlet.

The conversion device further comprises a chamber 202 provided with a first inlet connected to the first outlet of steam generator 201. The first fluid takes a first path in chamber 202 between the first inlet and a first outlet. Chamber 202 is configured to perform isothermal expansion of the first fluid in chamber 205 by means of a fractioned expansion by a plurality of elementary isothermal expansions. Chamber 202 is provided with a second inlet connected to heat transfer fluid feed line 206. The heat transfer fluid takes a second path distinct from the first path between the second inlet and a second outlet. The second outlet of the chamber is connected to the second inlet of steam generator 201. The first path is thermally coupled to the second path so as to heat the first fluid between each expansion.

The conversion device further comprises a mixing device connected to the first outlet of chamber 202 and to the second outlet of steam generator 201. The mixing device is configured in such a way as to mix the first fluid in vapour form with a heat transfer fluid to obtain a two-phase mixture.

What is meant by a fluid is a liquid or a gas.

Advantageously, the first chamber is a once-through steam generator 201 with variable superheating. In preferential manner, the second chamber is an isothermal spillway 202 maintaining the outlet pressure of steam generator 201 at constant pressure, the inlet line is an injector 205, an injector 204 is configured with a spray nozzle 203 and the outlet of the first fluid from spillway 202 so as to generate a two-phase mixture.

The device advantageously enables mechanical energy to be generated from thermal energy in three separate phases:
  Vaporization and superheating of the water under pressure
  Isothermal expansion which transforms the thermal energy of the gas into kinetic energy
  Transfer of the kinetic energy from the gas to the heat transfer liquid inside the mixing device.

The device presents fully mechanical regulation and avoids any electronics being present in the device.

According to a preferred embodiment, the heat transfer fluid feeds a primary circuit successively associated with spillway 202, steam generator 201 and spray nozzle 203.

The hot heat transfer fluid originating from a hot source 206 is input to isothermal spillway 202 where it heats the steam during its expansion.

The device advantageously enables superheated steam to be generated and expanded under pressure, from 10 bar 290° C. to 1.5 bar 290° C., from a heat transfer fluid flux. This isothermal expansion enables the steam to be given a velocity of about 130 m/s.

Advantageously, the first fluid in vapour form expands to 1.5 bar in isothermal spillway 202 while at the same time keeping its temperature due to a heat input of the heat transfer fluid.

On outlet from the isothermal spillway, the heat transfer fluid is inlet to the primary circuit of a once-through steam generator 201 at the outlet of which it is inlet in a state of slight sub-saturation, about 2 to 5° C., by a spray nozzle 203, into the steam flux outlet at high speed from the pressure reducer to generate a two-phase flux in an injector 204 which is output from the latter at atmospheric pressure.

A once-through steam generator advantageously enables a simple fluid flow system to be had at low cost, and enables the losses due to friction to be reduced compared with a multiple-passage generator.

Advantageously, the path taken by the heat transfer fluid is configured in a first stage in such a way as to preserve the temperature of the first fluid in isothermal spillway 202. In a second stage, it is input to a "primary circuit" of the steam generator. In a third stage, the heat transfer fluid is mixed with the fluid in vapour form to generate the two-phase flux.

Isothermal spillway 202 keeps the outlet pressure of the once-through steam generator with variable superheating 201 at a constant value whatever the steam flowrate produced.

The device thereby enables a two-phase mixture to be generated at high speed from superheated steam under pressure and a heat transfer fluid, separating the functions of generating superheated steam under pressure, isothermal expansion of the steam and mixture of the steam at high speed with the heat transfer fluid.

What is meant by two-phase mixture is a mixture comprising two distinct phases. Preferably this involves a liquid phase and a gas phase. The gas phase is preferably water vapour. The liquid phase is advantageously a heat transfer material in liquid form. For example the heat transfer material can be a heat transfer fluid such as glycerol.

Figure 7:
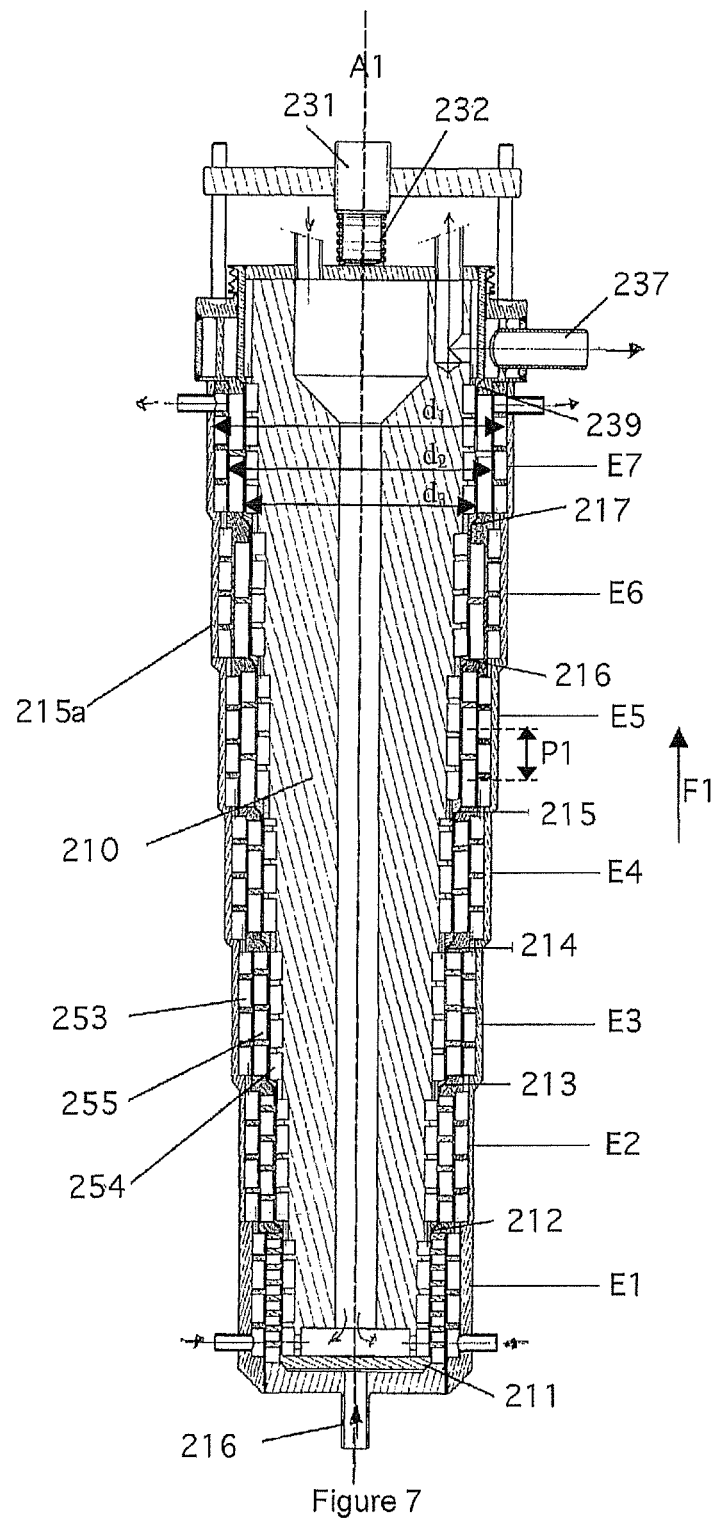
FIG. 7 gives a schematic cross-section via a vertical plane of the isothermal spillway system according to the invention.
Figure 8:
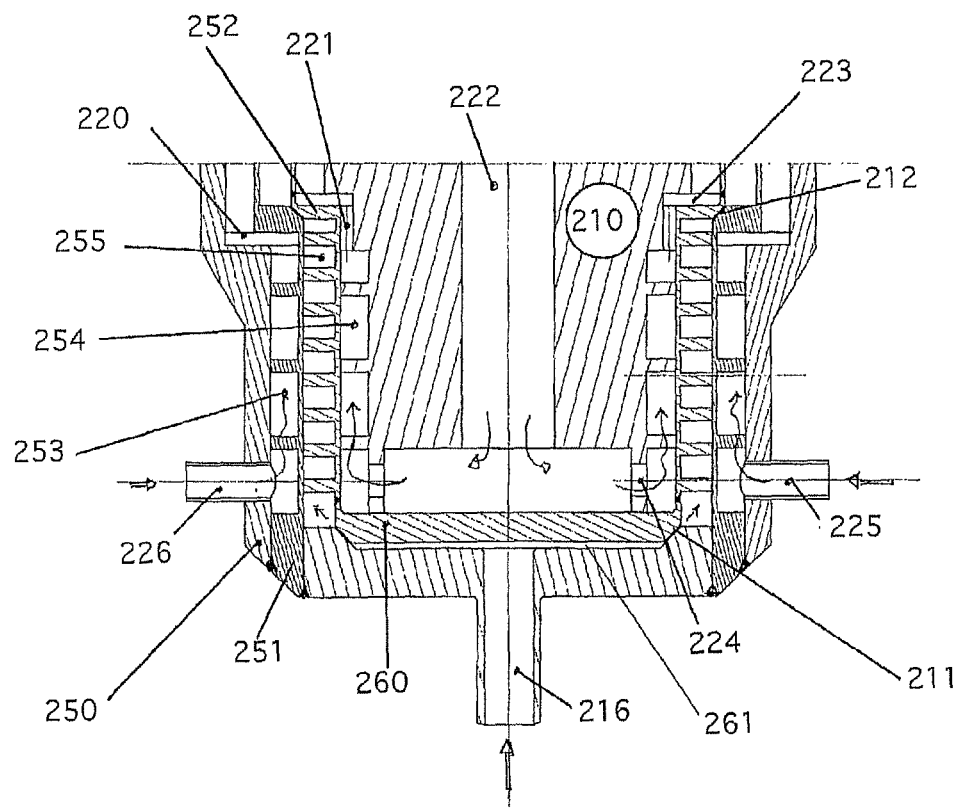
FIG. 8 gives a schematic cross-section via a vertical plane of the isothermal spillway on the steam inlet side according to the invention.
Figure 9:
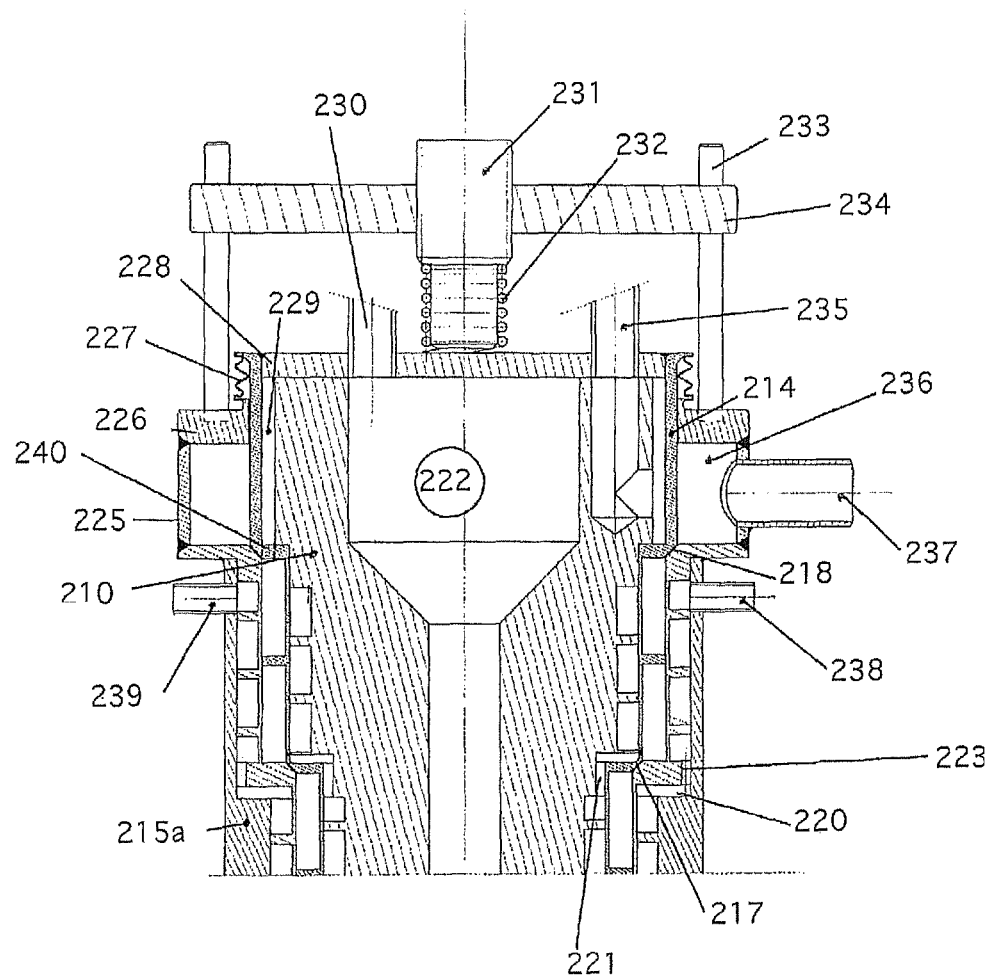
FIG. 9 gives a schematic cross-section via a vertical plane of the isothermal spillway on the steam outlet side according to the invention.

As represented in FIGS. 7, 8 and 9, the isothermal spillway is preferably formed by a fixed body 215a and a movable valve 210. The tightness between the between the movable valve and the fixed body is achieved by a bellows 227. The movable valve and the fixed body constitute seven heating stages each separated by eight laminating devices 211, 212, 213, 214, 215, 216, 217, 239.

According to another embodiment, the laminating systems could be replaced by valves.

Advantageously, the diameter of laminating systems 211, 212, 213, 214, 215, 216, 217, 239 increases between inlet 216 and outlet 237 of spillway 202.

These devices are formed by a male cone machined on the movable valve and by a female cone machined in the fixed body. The dimensions of the openings of these valve/seat assemblies are determined so that their head loss is identical on account of the pressure, and therefore of the mass volume, of the steam at their respective inlet.

The diameters of the valve/seat assemblies are increasing between the bottom and the top of the spillway so as to be able to fit movable valve 210 in body 215a.

The head loss of each laminating device is about 1.25 bar at all flowrates comprised between zero and the nominal flowrate of the pressure reducer. The air-gap of the laminating devices, and therefore their head loss, is fixed by the antagonism of the action of spring 232 and of the force due to the pressure difference between the inlet and outlet: it is the operation of a conventional industrial pressure reducing spillway which maintains a constant head loss at variable flowrate.

Screw 231 enables the expansion value to be adjusted by modifying the compression of spring 232. Screw 231 advantageously enables the head loss in the circuit to be controlled, thereby controlling the upstream pressure which is the pressure on outlet from steam generator 201.

After each expansion in a laminating device, the steam is reheated up to the next device by the walls which surround its flow channel 255, in the fixed part and in the movable part.

Advantageously, the flow channel of the first fluid in vapour form comprises spirals of fixed pitch between two laminating devices, said pitch increasing at each stage.

What is meant by channel is a thread of rectangular cross-section. The pitch is the distance that separates two sections on the same generating line of the shell, after a turn of the spiral, and it is independent from the cross-section.

Advantageously, spillway 202 comprises three shells 250, 251, 252 arranged to respectively form three channels hermetically sealed off from one another. A shell is for example a hollow cylindrical tube.

The fixed body is formed by two concentric shells 250 and 251 hot pressed in one another and secured to one another by welding. Shell 250 is machined on the outer diameter in the form of a screw of constant pitch and rectangular cross-section the diameter of which increases at each stage.

Shell 250, with shell 251, forms the lateral flow channel of the heat transfer fluid in body 215a.

The movable valve is formed by a core 210 on which a screw of constant pitch and depth having a diameter which increases at each stage is also machine-cut. What is meant by machine-cut is machined for example on a lathe, a milling machine or with a machining centre.

A shell 252 provided with a bottom is hot pressed on the core machined in this way, the shell delineating heat transfer fluid channel 254 in movable valve 210. A spiral of constant depth 255 the pitch of which remains constant over a stage and increases at each stage is cut on the outer diameter of shell 252 of movable valve 210. Advantageously, the spiral-wound channel of variable pitch and diameter constitutes a divergent designed to let the vapour flow from the outlet of steam generator 201 to the inlet of injector 204.

The cross-section of the spiral for a stage, and therefore its pitch, is proportional to the specific volume of the vapour at mean pressure of the considered stage. The successive spirals of the steam enable the velocity of the vapour to be made to vary from 60 m/s at 10 bar on inlet of the spillway to 130 m/s at 1.5 bar on outlet.

The vapour is conveyed from inlet 216 to outlet 237, via a circular collector 236, in channel 255 formed by a plurality of spirals at constant pitch, separated by laminating devices 211, 212, 213, 214, 215, 216, 217, 239.

The heat transfer fluid flux flowing in the two channels 253 and 254 provides heat to the steam flux flowing in spiral 255. The heat transfer fluid flow channels are advantageously helical or spiral-wound and located on each side of the flow channel of the first material in vapour form. Preferably, the channels are of fixed pitch and depth and their diameter varies at each stage.

The residual thicknesses at the bottom of the groove from machining of shell 250 and of shell 252 are reduced to about 1.5 mm so as to foster heat exchange between the heat transfer fluid and the vapour that expands.

The functional clearance of 1 to 2/10 mm which enables movement of valve 210 with respect to body 215a is located between shell 251 and shell 252.

The continuity of heat transfer fluid flows between the stages of movable valve 210 of different diameters takes place by means of counterboring or passage 223 and of hole 221.

Advantageously, the counterbores or holes can fulfil the function of passage between two stages.

Feed of heat transfer fluid to screw 254 of the core is performed via an inlet 230 followed by a central channel 222 which feeds the base of screw 254 via diaphragms 224. Outlet takes place via holes 240 which open into an annular collector 229 connected to an outlet 235.

Feed of heat transfer fluid to screw 253 of fixed body 215a is performed via two inlets 225 and 226. Outlet takes place via collectors 238 and 239.

Advantageously, two inlets 225 and 226 enable screw 253 to be fed with heat transfer fluid. According to another embodiment, a single heat transfer fluid inlet is present in the device.

A device with two inlets enables the velocity of inlet fluid to be increased and losses to be reduced.

The continuity of heat transfer fluid flows between the stages of different diameters takes place via bores 220 and holes 223.

The use of flow in spiral channels for the exchanges between fluids enables large improvements of the exchange coefficients to be obtained due to the increased turbulence. Furthermore, the fact of having a spiral-shaped divergent enables a large compactness of the device to be obtained. Wound, it has a height of about 800 mm, in straight flat version it would be about 12 m long.

The device also enables water as thermodynamic fluid and glycerol as heat transfer fluid to be made to work together, avoiding the problem of absorption of the water by the latter at 10 bar, which results in difficulties in obtaining a really isothermal expansion in double phase. As water is vaporized during expansion, it is impossible to supply latent heat by transfer between phases or by external heat input. Glycerol has a very great advantage as far as dangerousness is concerned:

it is in fact comestible and this device prevents the dissolution phenomenon which disturbs the isothermality of expansion.

The use of a mechanical spillway avoids having to fit a control valve and its control electronics on outlet from the once-through steam generator.

The converter of thermal energy into mechanical energy of the invention enables isothermal expansion of the thermodynamic fluid to create the quantity of movement. It can for example equip the electricity generation modules using an impulse wheel the simplicity and efficiency of which are particularly attractive.

In another preferred embodiment, on outlet from the expansion system, the flowrate of heat transfer fluid in slight sub-saturation, about 2 to 5° C., is injected into the gaseous vein in the form of fine droplets the size of which is adjusted for them to be displaced practically at the speed of the steam over a short distance. The mixture is then projected onto the buckets of an impulse turbine.

In other words, the spillway can comprise two elements, a first element being movable in the fixed second element.

The second element then comprises an outer shell 250 in which a central shell 251 is engaged so as to delineate a first spiral channel 253 around a longitudinal axis A1 of the spillway, said axis A1 extending from a first end of the spillway to a second end of the spillway. Outer shell 250 and central shell 251 are fixed with respect to one another, in other words they are located in the same movement reference frame.

The first element comprises a body 210 that is elongate along the longitudinal axis A1 of the spillway and is provided, on its longitudinal outer surface in the direction of A1, with a spiral groove designed to delineate a second spiral channel 254 surrounding the axis A1. An inner shell 252 is engaged on elongate body 210 so as to close the groove and form the second spiral channel 254. In other words, in general manner, elongate body 210 and inner shell 252 are configured to delineate the second spiral channel surrounding the longitudinal axis A1.

The first element is fitted movable in the second element so that inner shell 252 is facing central shell 251. Inner shell 252 and central shell 251 are configured to delineate a third spiral channel 255. In fact, first, second and third spiral channels 253, 254, 255 can be seen as three concentric spirals, third channel 255 being located between first channel 253 and second channel 254.

The spillway is configured in such a way that the first, second and third channels are tightly sealed with respect to one another. First and second channels 253, 254 are designed to make the heat transfer fluid flow, whereas third channel 255 is designed to make the fluid in vapour form coming from the steam generator flow. The function of first and second channels 253, 254 is advantageously to control the temperature of the fluid in vapour form to preferably keep its temperature constant during movement of the latter in the spillway. The first channel can be supplied by a heat transfer fluid between at least one inlet 225, 226 at the level of the first end of the spillway, and at least one associated outlet 238, 239 located at the level of the second end of the spillway. In FIGS. 7 to 9, there are two inlets 225, 226 and two outlets 238, 239, which enables the fluid input to be increased, but a single inlet and/or a single outlet could suffice. Second channel 254 can be supplied with heat transfer fluid at the level of the first end (inlet 224) of the spillway by a central channel 222 formed in body 210 of the first element, said central channel being connected by a flexible heat transfer fluid inlet pipe at the level of the second end of the spillway. The heat transfer fluid associated with second channel 254 can then flow between inlet 224 and an outlet 235 located at the level of the second end of the spillway. Third channel 255 is for its part supplied at the level of the first end of the spillway, and the flowrate can be adjusted by a first laminating system 211. In fact, to supply third channel 255, the spillway can comprise an inlet 216 of the fluid in vapour form opening into a cavity 261 the volume of which can vary according to the position of the first element with respect to the second element, and the cavity communicates with third channel 255 via first laminating system 211. An outlet 237 of third channel 255 is advantageously situated at the level of the second end of the spillway. At least first laminating system 211 advantageously enables the pressure upstream from the spillway, i.e. the pressure on outlet from the steam generator, to be adjusted. In fact, in FIG. 7, the respective inlets of the first, second, and third channels are located at the level of the first end of the spillway and their respective outlets are located at the level of the second end of the spillway.

Advantageously, the pressure of the fluid at the inlet of the spillway is 10 bar and the pressure on outlet is 1.5 bar.

As illustrated in FIG. 7, to control the velocity of the fluid in vapour form through the spillway, the latter is divided in the direction of its longitudinal axis into several stages (in the example of FIG. 7 for example, there are seven stages numbered E1, E2, E3, E4, E5, E6, E7). This velocity of the fluid in vapour form can be controlled in particular by increasing the pitch of the propeller of third spiral channel 255 and the cross-section of said third channel (in fact in this case the pitch corresponds to the distance separating the centre of the channel between two portions/turns of channel according to the cross-section of FIG. 7 where the pitch is identified by the reference P1). To control the velocity and expansion of the fluid in mechanical manner, the diameter of the turns $d_1$, $d_2$, $d_3$ respectively of the spiral channels 253, 255, 254 increases between each stage E1, E2, E3, E4, E5, E6, E7 in the direction of propagation of the fluid in vapour form (the direction of propagation is indicated by arrow F1 in FIG. 7, this direction being substantially parallel to the longitudinal axis A1 of the spillway). Furthermore, to mechanically control the expansion and flowrate between each stage and to keep the velocity of the fluid, the spillway comprises laminating systems, a laminating system 211, 212, 213, 214, 215, 216, 217, 239 being arranged at the interface between each stage. A laminating system is advantageously implemented by the fact that one surface of central shell 251 and one surface of inner shell 252 are able to occupy a proximal position in which the two surfaces can be in contact or separated by a distance according to which lamination is maximal (the system then acts as an almost closed valve), and a distal position in which lamination is minimal (the system then acts as an open valve).

Advantageously, the set of laminating systems enables the pressure upstream from the spillway, i.e. the pressure on outlet from the steam generator, to be efficiently adjusted.

Advantageously, the velocity of the fluid is comprised between 50 m/s and 100 m/s in order to avoid head losses, erosion of the channels, friction and turbulences which would result in poor lamination and/or damaging of the channels. Moreover, a too high velocity would cause a loss of adjustment sensitivity and the action of the spring on the device would be ineffective.

In the example of FIGS. 7 to 9, given that the diameter d1, d2, d3 of the turn of each channel increases from one stage to the other, in ideal manner passages 220, 221, 223 are arranged to match the last turn of a stage with the first turn of an associated stage in the direction of propagation F1 of the fluid in vapour form for first and second channels 253, 254. Passage from one stage to the other of third channel 255 is for its part performed by the laminating systems.

The use of fractioned expansion, in the event of an operating problem arising, for example in the case of leakage, enables the leakage to be confined to a single stage.

On account of the mobility of first element in the second element, inner shell 252 is separated from central shell 251 by a functional clearance to enable translation of the first element with respect to the second element along the longitudinal axis A1. This functional clearance introduces the presence of direct fluid passages between two adjacent spires of the spiral delineating third spiral channel 255. In other words, the fluid for the most part moves in the direction F1 along channel 255 winding itself around the longitudinal axis A1 of the spillway and a part of the fluid passes from one turn to the other via gaps due to the functional clearance. However, the by-passes induced by these gaps are negligible in the scope of the implemented functional clearance.

As indicated, the mobility of the first element with respect to the second element enables lamination to be implemented in mechanical manner. The mechanical system enables a compact device to be obtained limiting problems due to electronics (power supply, maintenance, etc.). The position of the first element with respect to the second element, and therefore adjustment of the laminating systems, can be performed via a pressure system 231, 232 for example implemented by a retaining screw 231 in conjunction with a spring 232. Pressure system 231, 232 enables the pressure to be adjusted in order to advantageously have a constant pressure on outlet from steam generator 201.

Naturally, without any problems of space or electronics arising, the person skilled in the art can achieve the different stages by implementing distinct remote-controlled valves, for example electric valves, and heat exchangers between each valve to heat the steam, in which case the first element does not need to be fitted movable in the second element. The number of stages has been given for example purposes, and quite naturally, according to the application, the person skilled in the art will be able to calibrate the stages and their numbers.

In a third case and according to another preferred embodiment, the heat transfer fluid is used in a thermal and electric energy storage and production unit on an isolated site from solar energy comprising: a solar energy collection and concentration device, a heat transfer fluid circuit which transports the thermal energy to a conversion module into electric power, a storage system of the original thermal energy which enables electricity production to be maintained during the night or during cloudy spells. This production unit has to operate without interruption or maintenance operations for several years under harsh climatic conditions: ambient temperature of 70° C., sandstorms, gale force winds, and non-industrialized rural vernacular habitat environment.

In the storage of the electric power production unit forming the object of the invention, its capacity, all other things being equal, is increased by a factor five compared with a conventional storage, as loading of the stock is performed in two different manners: firstly by the heat provided by the solar concentrator, then when the temperature of the tank is equal to that of the heat transfer fluid on outlet from the concentrator, by electric immersion heaters supplied by the alternator of the module for converting thermal energy into electric power. The temperature of the stock can be taken up to about 450° C., the concentrator first heating the heat transfer fluid to about 300° C.

In this storage configuration called "thermoelectric storage", the immersion heaters can absorb all of the power supplied by the alternator.

According to a particular embodiment, with a branch-off of the heat transfer fluid circuit, it is possible to heat a bread oven and cooking plates thus able to be operate in the absence of sunshine.

The installation for storing heat energy comprises a heat transfer fluid tank 308, a solar concentrator 301 coupled to tank 308 and configured to heat the heat transfer fluid, and an immersion heater 310 arranged in tank 308. A steam generator 302 is supplied by the heat transfer fluid. An alternator 306 is supplied by means of said steam, alternator 306 being configured to supply the immersion heater when the temperature of tank 308 equals the temperature of the heat transfer fluid on outlet from concentrator 301, so as to increase the temperature of tank 308 above the temperature of concentrator 301.

Figure 10:
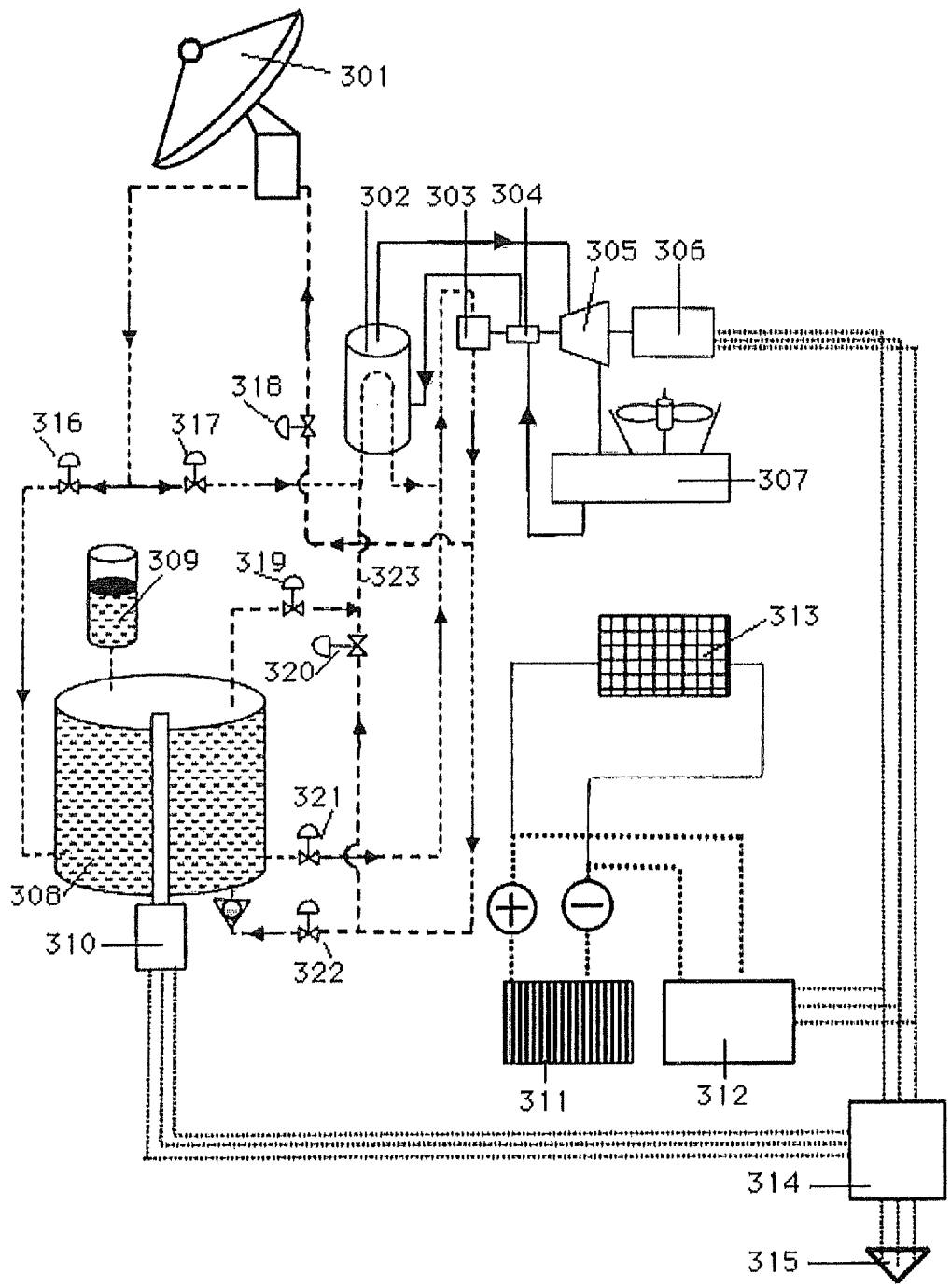
FIG. 10 gives the diagram of the storage system.

Operation of the thermoelectric storage is illustrated by FIG. 10.

The thermal energy coming from the sun's rays is collected and concentrated in a concentrator 301 which heats the heat transfer fluid which supplies the primary of a steam generator 302. The latter produces steam which drives a turbine 305.

The following are fitted on the shaft line of the turbine: the gear pump for the heat transfer flow 303, feed pump 304, and an alternator 306.

The steam outlet from the turbine is condensed and sub-saturated in the set of finned tubes of cooling tower 307, and the condensed water is then collected in the well of the cooling tower and conveyed to steam generator 302 by feed pump 304.

Storage tank 308 is, like the rest of the heat transfer fluid circuit, kept at a pressure of about 5 bars by the gear flow pump 303.

A membrane accumulator 309 acts as an expansion tank to compensate the expansion or contraction of the fluid contained in the storage tank and the set of circuits during temperature variations.

The alternator feeds to a distribution network 315, and to immersion heaters 310, enabling storage tank 308 to be heated. Distribution of the powers between user power network 315 and immersion heaters 310 is performed by a distributor 314.

The method described in the above enables operation of the unit in daytime phases with continuous sunshine or with cloudy weather conditions and in night-time phases.

Figure 11:
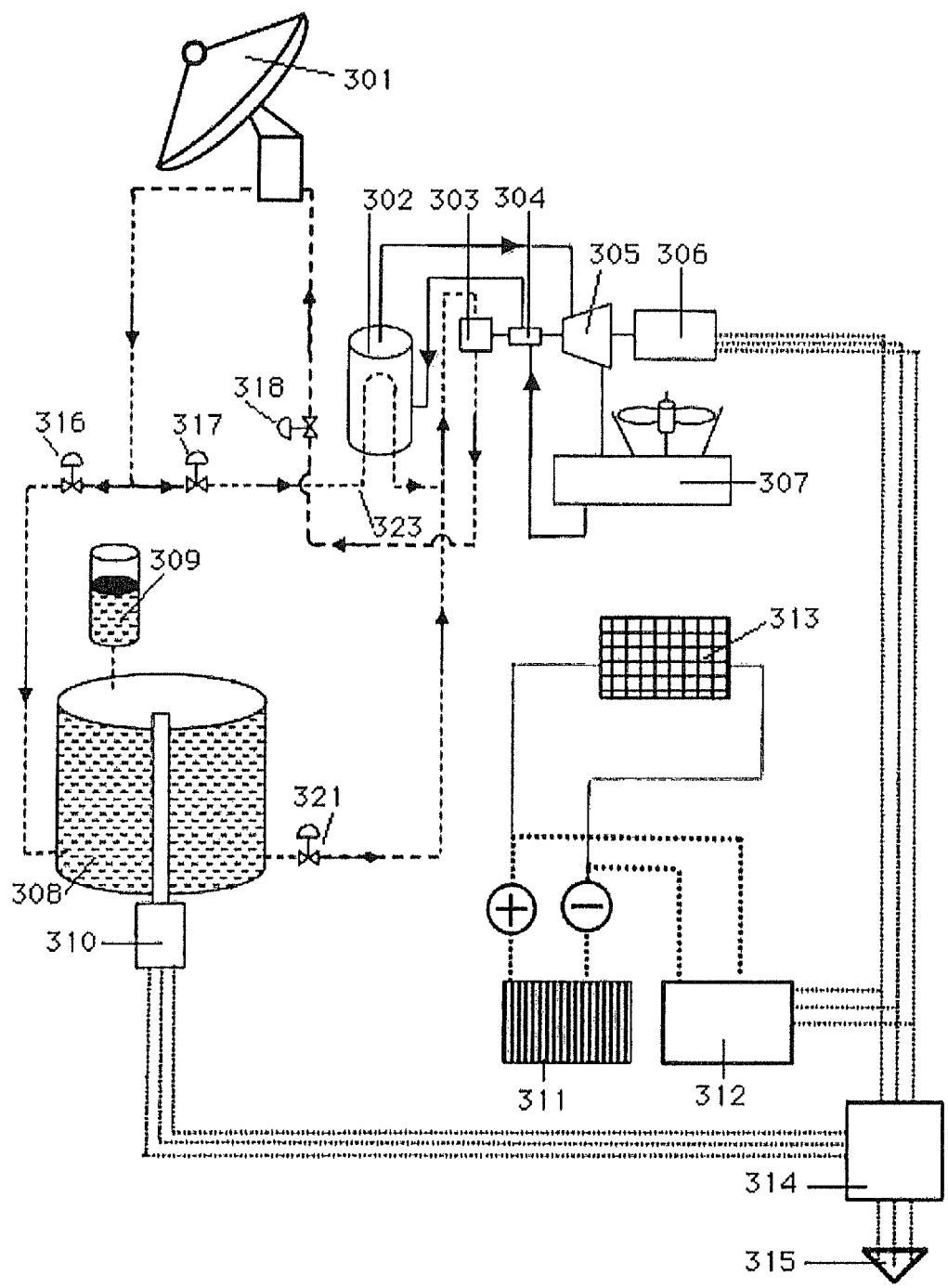
FIG. 11 gives the diagram of the storage system limited to the circuits and open or controlled valves during the phase of electricity production and of heating of the stock by the concentrator.

FIG. 11 gives the image of the circuits and open valves in control operation during the daytime phase with continuous sunshine.

The method operates in the following manner:

As soon as the solar concentrator focuses the sun's rays, the shaft line is started up by alternator 306 operating as a motor and supplied by a battery 311, via a control module 312. The battery is kept on charge by means of photovoltaic panels 313.

The heat transfer fluid circuit is arranged to feed the stock and the steam generator in parallel: valves 316, 317, 318 are open, and valves 319 322 are closed. Control valve 321 ensures a good distribution of the flowrates between the flow on the stock and that in the steam generator primary system. These two flowrates join at the suction of heat transfer fluid flow pump 303.

According to a preferred embodiment, the heat transfer fluid flows between solar concentrator 301 and tank 308, by means of a gear volumetric flow pump 303, coupled to the shaft line of turbine 305, which, with a membrane accumulator 309, keeps tank 308 at a higher pressure than the saturation pressure corresponding to the temperature of the heat transfer fluid.

When the steam generator is operating and the turbine starts driving, the alternator switches to production mode. The nominal power of the alternator and of the solar concentrator is chosen to absorb the solar flux corresponding to the power to be supplied to the network plus the power to be stored during the hours of sunshine.

Figure 12:
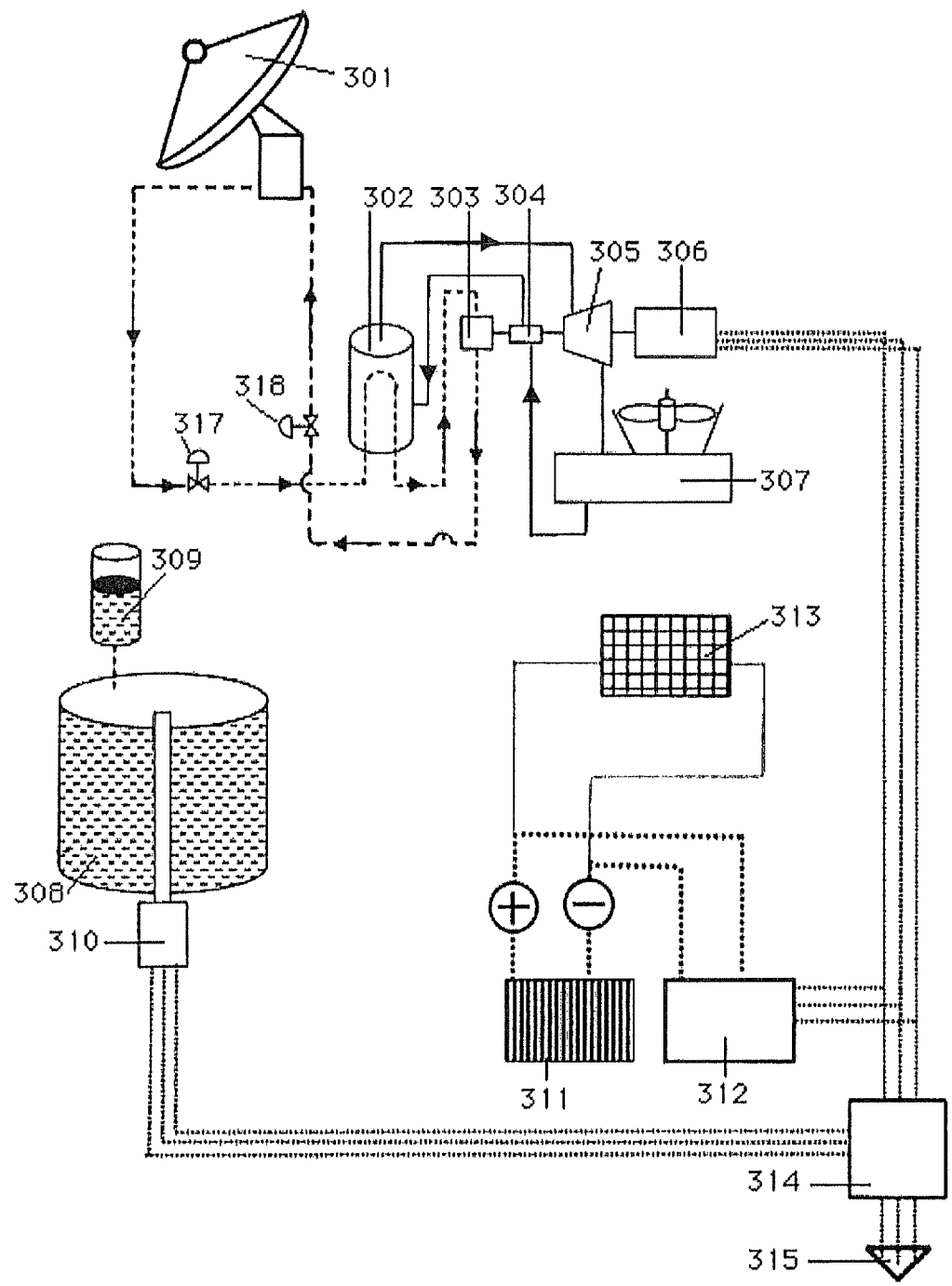
FIG. 12 gives the diagram of the storage system limited to the circuits and open or controlled valves during the phase of electricity production and of heating of the stock by the immersion heaters (large loop).

As soon as the energy produced by the alternator is greater than that supplied to the network and to pumps 303 and 304, and the temperature of the stock is equal to the outlet temperature of the concentrator, valves 316 and 321 are closed and the surplus electric power is distributed by Joule effect in immersion heater 310: it is thus stored in the form of thermal energy and the temperature of storage 308 increases to exceed the outlet temperature of concentrator 301. The heat transfer fluid circuit operates in "large loop" mode. This operating mode is illustrated by FIG. 12.

Tank 308 containing heat transfer fluid is thus recharged with thermal energy, first by a flux of hot transfer fluid originating from concentrator 301, and then by immersion heater elements fed by alternator 306 when its temperature is equal to that of the heat transfer fluid on outlet from concentrator 301 and configured so that the temperature of storage tank 308 can reach a much higher temperature (450° C.) than that of the heat transfer fluid on outlet from concentrator 301 (300° C.).

Figure 13:
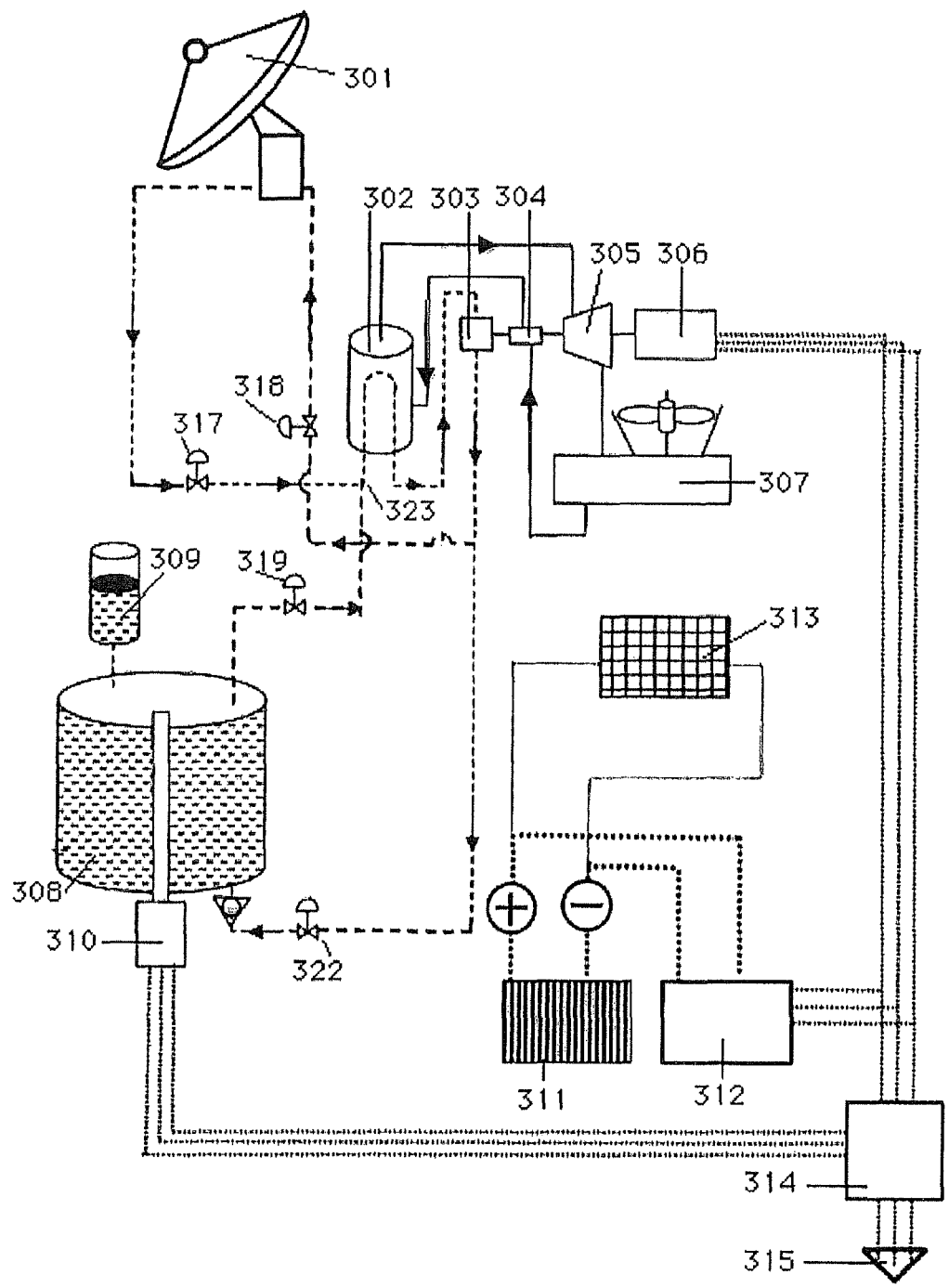
FIG. 13 gives the diagram of the storage system limited to the circuits and open or controlled valves during the phase of electricity production and of heating assistance of the large loop by injection of hot transfer fluid into the latter in case of intermittent cloud cover.

FIG. 13 gives the image of the circuits and open valves in control operation in a daytime phase with cloudy weather conditions. The method operates in the following manner: passage of episodic clouds hiding the sun reduces the heating of the heat transfer fluid in the concentrator. The temperature 323 on inlet to the steam generator is kept constant by opening of valve 322 and switching of valve 319 to control mode which injects heat transfer fluid coming from stock 308 during the cloudy spell. If the cloudy spell lasts for too long, the circuit switches to night mode.

Figure 14:
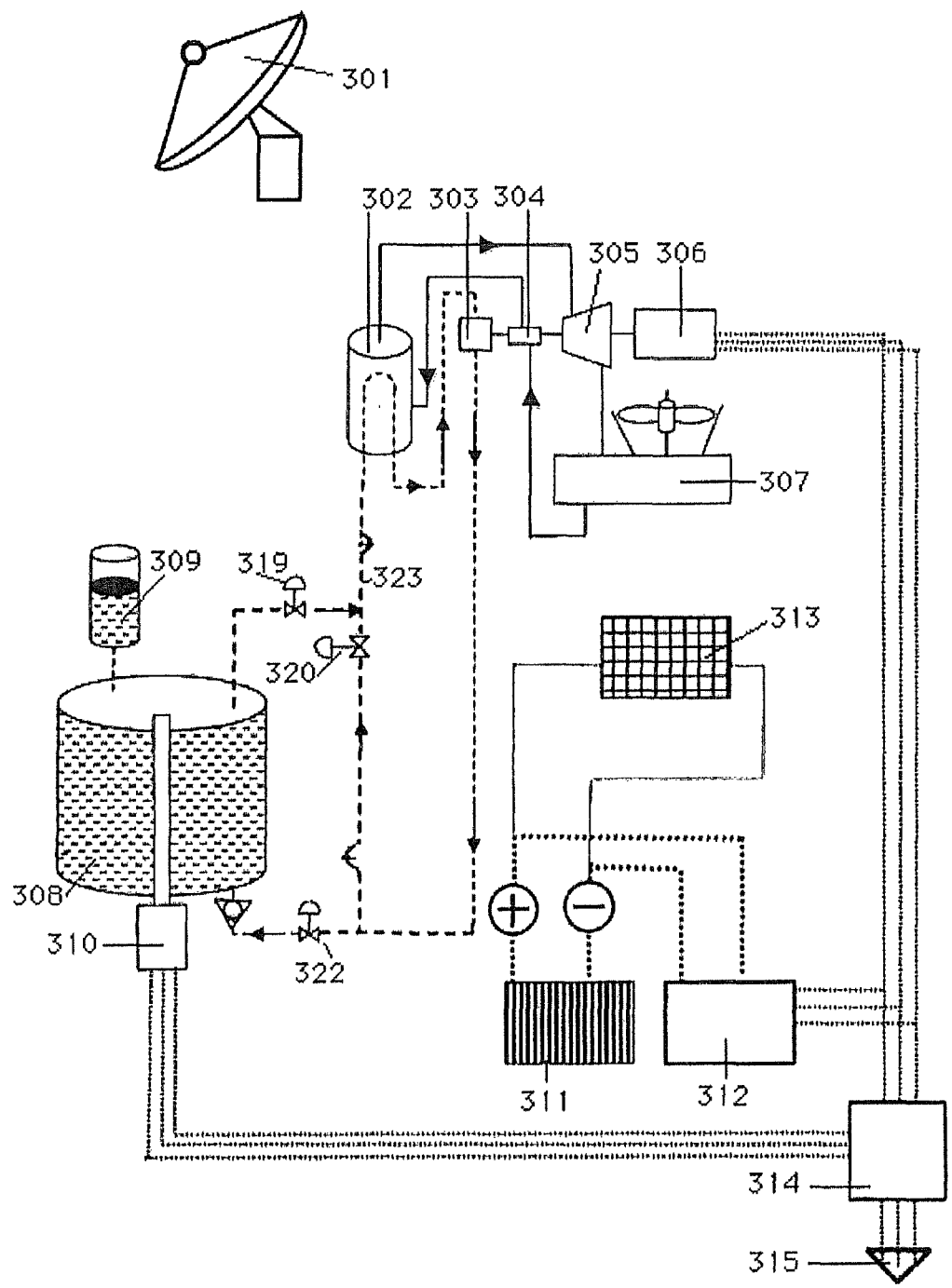
FIG. 14 gives the diagram of the storage system limited to the circuits and open or controlled valves during the phase of electricity production and of temperature regulation, by injection of hot transfer fluid during a long disappearance of the solar source, (very cloudy weather or night-time), the solar concentrator being isolated to prevent energy losses (small loop).

FIG. 14 gives the image of the circuits and open valves in control operation in a night-time phase. The method operates in the following manner: as soon as the solar energy is no longer available, valves 317, 318, 321 are closed and valves 320 and 322 are opened and the temperature of heat transfer fluid 323 at the inlet of steam generator 302 is kept constant by control valve 319 which injects hot transfer fluid coming from storage tank 308 into the primary circuit of steam generator 302. The heat transfer fluid circuit operates in "small loop" mode.

Figure 15:
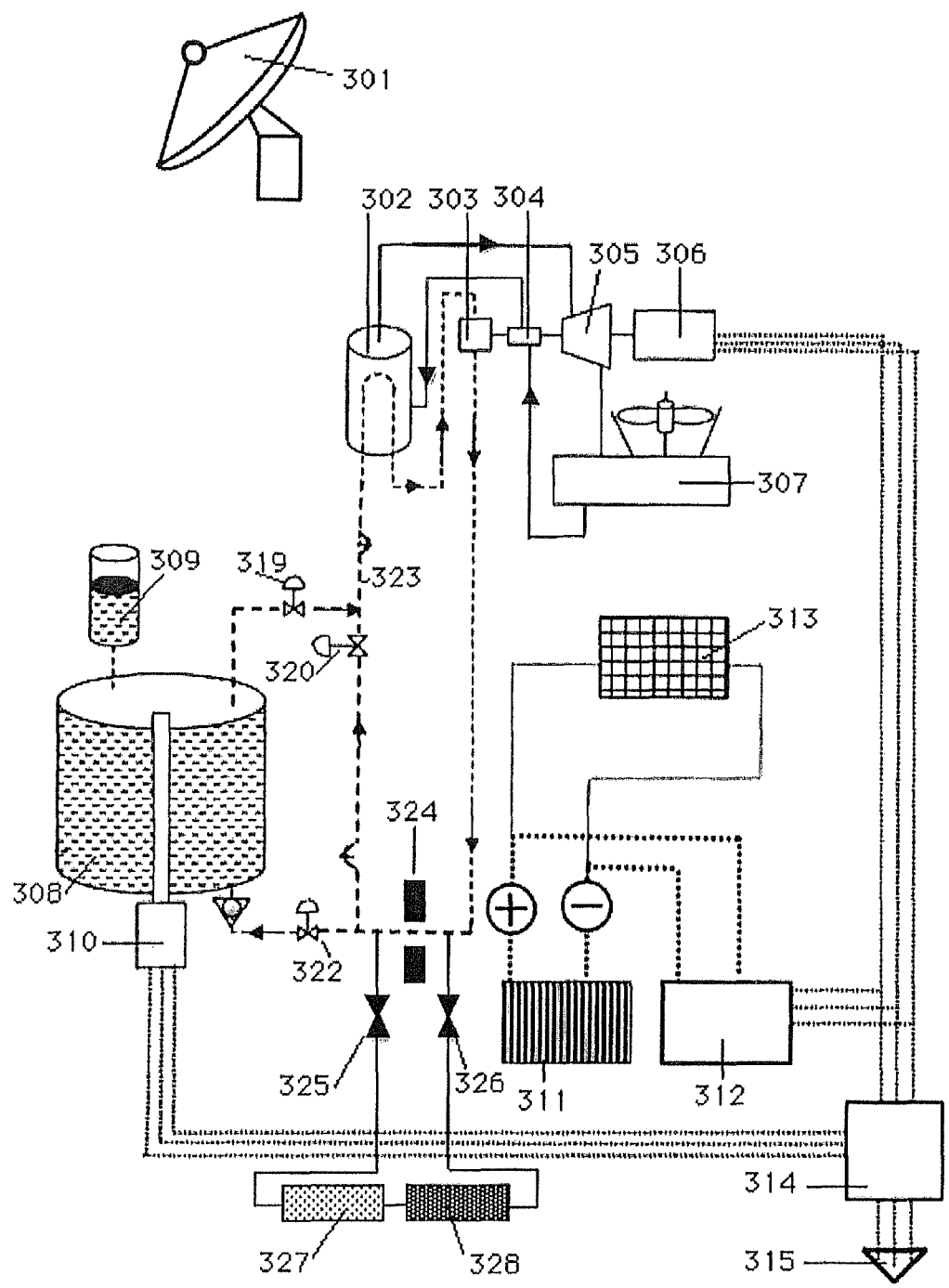
FIG. 15 gives the diagram of the storage system according to the particular embodiment using cooking devices.

After sunset, it is possible for example, according to a particular embodiment represented in FIG. 15, to heat a bread oven 327 and cooking plates 328 by arranging two valves 325 and 326 which enable a fraction of the flowrate of heat transfer fluid to be branched off from the small loop to the terminals of a diaphragm 324. A branch circuit is connected between flow pump 303 and tank 308 in order to feed a bread oven 327 and cooking plates 328.

An outlet strip is coupled to alternator 306 and is designed to supply a power distribution network 315. Distributor 315 is arranged between the outlet strip and the alternator, the immersion heaters being connected to the alternator by means of the distributor. The distributor is configured to switch most of the power from the alternator onto the immersion heaters.

When the user network 315 trips during a sunny period, for example on an isolation fault, as the absorbed power becomes zero, charging of the alternator also drops to zero and the turbine is instantaneously discharged.

Load transit is avoided as the power supplied by the machine is directed to the immersion heater by distributor 314.

If the storage capacity is reached (the temperature of the stock being 450° C.), the solar concentrator is defocussed by rotation of the mirrors which compose it. If this tripping takes place in the absence of sunshine, the alternator power is first switched to immersion heaters 310, and then slowly reduced.

Preferably, immersion heaters 310 are configured to distribute the whole of the power of the alternator. Turbine 305 only drives pumps 303 and 304 to keep the circuit on hot shot-down.

The operating regime of the alternator is thus kept at its nominal point during the load loss of the user network 315 without a thermal transient and without opening of the safety valves of steam generator 302.

In this situation, the flowrate is nominal in diaphragm 324 and the turbine in rotation at minimum power to limit the consumption of the stock to the minimum. This way of dealing with the network trip transient makes it possible not to lose thermodynamic fluid, which takes place on opening of valves in a conventional Rankine cycle using steam turbines. This particularity also makes it possible not to lose solar energy during the interruption of the user network due to thermo-electric storage and to avoid complicated control and monitoring able to restart automatically as soon as the network demand is restored.

The auxiliaries of the unit do not have a motor, which results in an increase of the global efficiency and of the dependability in a desert environment. The fact that the alternator with permanent magnets is reversible makes it possible to make the pumps run on start-up of the installation: this avoids having to have a starter motor.

The use of a gear pump to make the heat transfer fluid flow enables the storage tank to be pressurized without using another specific pump. The use of a thermo-electric storage enables the problem inherent to solar power stations to be dealt with: disappearance followed by reappearance of the sun when a cloudy spell occurs, disappearance of the sun during the night, nuisance tripping of the user power system avoiding waste of fluid and of collected energy.

Furthermore, the storage and a branch-off of the flow pump can heat cooking plates and a bread oven after sunset. This would make it possible to avoid the deforestation that takes place in Sahelian areas, on islands such as Haiti where the population cuts the vegetation down intensively to keep the household fires burning to cook their food.

This type of storage, and the energy production unit which goes with it, is a good answer to power production on an isolated site, which requires heat and electric energy day and night for the vital requirements of village populations.

The invention claimed is:

1. An installation for performing conversion of thermal energy into mechanical energy, the installation comprising:
   a heat transfer fluid source providing a heat transfer fluid;

a vaporizable fluid source providing a vaporizable fluid, the vaporizable fluid having a temperature of vaporization;

an injector connected to the vaporizable fluid source and to the heat transfer fluid source, the injector being configured to (i) mix the heat transfer fluid with the vaporizable fluid so as to vaporize the vaporizable fluid, and (ii) form a jet from at least the mixture of the heat transfer fluid and the vaporizable fluid;

a heater connected between the heat transfer fluid source and the injector, the heater being configured to heat the heat transfer fluid;

an impulse wheel mounted rotatingly on a tank and secured to a shaft that extends along an axis substantially perpendicular to the at least one injector, the impulse wheel including a plurality of asymmetric blades, and the jet being injected onto the asymmetric blades so as to drive the shaft in rotation and to transform axial kinetic energy of the jet into rotational kinetic energy of the shaft;

the tank surrounding the impulse wheel, the tank including a bottom and a sidewall;

at least one deflector extending underneath the asymmetric blades, the at least one deflector presenting a shape arranged to recover the mixture of the heat transfer fluid and the vaporizable fluid on an outlet of the impulse wheel, and to redirect the mixture in a substantially tangential direction to the sidewall of the tank, so as to impart a cyclone effect on the mixture and to separate the heat transfer fluid from the vaporizable fluid;

a tight enclosure configured to enclose the tank and the impulse wheel, the tight enclosure including a first outlet configured to deliver the heat transfer fluid from the heat transfer fluid source to the injector, and a second outlet configured to deliver the vaporizable fluid; and a hole in a bottom part of the tank forming the first outlet of the tank, the hole being configured to provide heat transfer fluid to the tight enclosure, a bottom part of the tight enclosure storing the heat transfer fluid and forming the heat transfer fluid source.

2. The installation according to claim 1, wherein the at least one deflector comprises (i) a top face extending in a plane substantially perpendicular to a rotation axis of the impulse wheel, the top face defining at least one inlet opening of the mixture from the impulse wheel, and (ii) a side face extending in the vicinity of the wall of the tank and in a plane substantially perpendicular to the top face, the side face defining at least one outlet opening of the mixture.

3. The installation according to claim 2, wherein the deflector further comprises at least two inlet openings and at least two corresponding outlet openings, the at least two inlet openings being separated by at least one inner wall defining at least two substantially parallel flow channels.

4. The installation according to claim 2, wherein the heat transfer fluid is glycerol.

5. The installation according to claim 1, wherein the first outlet of the tight enclosure is disposed in the bottom part of the tight enclosure, and the second outlet of the tight enclosure is disposed in a top part of the tight enclosure, the first outlet of the tight enclosure and the second outlet of the tight enclosure being separated by the impulse wheel.

6. The installation according to claim 1, further comprising:

an inlet of the vaporizable fluid source, the inlet of the vaporizable fluid source being connected to the second outlet of the tight enclosure; and an alternator having a shaft, the alternator being configured to produce electric energy, and the shaft of the impulse wheel being fixed to the shaft of the alternator so that the shaft of the alternator is driven by the shaft of the impulse wheel to produce electric energy.

7. The installation according to claim 6, wherein the alternator has a cooling head connected between an outlet of the vaporizable gas source and the injector so as to cool the alternator and heat the vaporizable gas.

8. The installation according to claim 7, further comprising:

a desuperheater having an inlet connected to the second outlet of the tight enclosure;

a condenser having an inlet connected to an outlet of the desuperheater, the condenser being configured to condense the vaporizable fluid, an outlet of the condenser being connected to an inlet of the vaporizable fluid source; and a flow pipe connecting the cooling head to the injector passes through the desuperheater so as to heat the vaporizable fluid.

9. The installation according to claim 6, further comprising:

an immersion heater disposed in the heat transfer fluid tank, the immersion heater being supplied by the alternator.

10. The installation according to claim 1, further comprising:

a flow pump disposed in the heat transfer fluid source, the flow pump being configured to make the heat transfer fluid flow from the heat transfer fluid source to the heater, and the flow pump being driven by the shaft of the impulse wheel.

11. The installation according to claim 1, further comprising:

a heat transfer fluid tank different from the heat transfer fluid source, the heat transfer fluid tank being configured to store the heat transfer fluid, the heat transfer fluid tank having an inlet connected to the first outlet of the tight enclosure;

a branch circuit connecting an outlet of the heat transfer fluid tank to a flow pipe connecting the heater to the injector.

12. The installation according to claim 11, wherein the heater is a solar collector.

13. The installation according to claim 11, further comprising:

a second branch circuit connected between the first outlet of the tight enclosure and the heat transfer fluid tank, so as to make a fraction of the flow rate of the heat transfer fluid to supply at least one of a bread oven and cooking plates.

14. The installation according to claim 1, comprising a plurality of injectors configured to inject the mixture on the blades of the impulse wheel, and an equal number of deflectors extending underneath the blades of the impulse wheel.

15. The installation according to claim 1, further comprising:

a membrane accumulator configured to keep the heat transfer fluid tank at a higher pressure than a saturation pressure corresponding to the temperature of the heat transfer fluid in the heat transfer fluid tank.

16. The installation according to claim 1, wherein the injector is arranged to inject the jet onto the top part of the blades.

17. The installation according to claim 1, wherein the shaft of the impulse wheel is fitted on the bottom of the tank by at least one plain thrust bearing of hydrodynamic type so as to allow rotation of the shaft with respect to the tank.

18. The installation according to claim 1, wherein a tight enclosure is heat-insulated.

19. The installation according to claim 1, wherein each of the plurality of asymmetric blades has a top part and a bottom part, a radius of curvature of the top part being different from a radius of curvature of the bottom part so as to define an asymmetric concave shape for each of the plurality of asymmetric blades.

20. An installation for performing conversion of thermal energy into mechanical energy, the installation comprising:
- a heat transfer fluid source providing a heat transfer fluid;
- a vaporizable fluid source providing a vaporizable fluid, the vaporizable fluid having a temperature of vaporization;
- an injector connected to the vaporizable fluid source and to the heat transfer fluid source, the injector being configured to (i) mix the heat transfer fluid with the vaporizable fluid so as to vaporize the vaporizable fluid, and (ii) form a jet from at least the mixture of the heat transfer fluid and the vaporizable fluid;
- a heater connected between the heat transfer fluid source and the injector, the heater being configured to heat the heat transfer fluid;
- an impulse wheel mounted rotatingly on a tank and secured to a shaft that extends along an axis substantially perpendicular to the at least one injector, the impulse wheel including a plurality of asymmetric blades, and the jet being injected onto the asymmetric blades so as to drive the shaft in rotation and to transform axial kinetic energy of the jet into rotational kinetic energy of the shaft;
- the tank surrounding the impulse wheel, the tank including a bottom and a sidewall;
- at least one deflector extending underneath the asymmetric blades, the at least one deflector presenting a shape arranged to recover the mixture of the heat transfer fluid and the vaporizable fluid on an outlet of the impulse wheel, and to redirect the mixture in a substantially tangential direction to the sidewall of the tank, so as to impart a cyclone effect on the mixture and to separate the heat transfer fluid from the vaporizable fluid; and
- a plurality of injectors configured to inject the mixture on the blades of the impulse wheel, and an equal number of deflectors extending underneath the blades of the impulse wheel.

* * * * *